(12) United States Patent
Tanaka et al.

(10) Patent No.: US 8,877,420 B2
(45) Date of Patent: Nov. 4, 2014

(54) PARTICLES AND METHOD FOR PRODUCING THE SAME, TONER AND METHOD FOR PRODUCING THE SAME, DEVELOPER, PROCESS CARTRIDGE, IMAGE FORMING METHOD AND IMAGE FORMING APPARATUS

(75) Inventors: Chiaki Tanaka, Shizuoka (JP); Ryota Inoue, Osaka (JP); Taichi Nemoto, Shizuoka (JP); Yoshitaka Yamauchi, Shizuoka (JP)

(73) Assignee: Ricoh Company, Ltd., Tokyo (JP)

(*) Notice: Subject to any disclaimer, the term of this patent is extended or adjusted under 35 U.S.C. 154(b) by 37 days.

(21) Appl. No.: 13/581,953

(22) PCT Filed: Mar. 9, 2011

(86) PCT No.: PCT/JP2011/056126
§ 371 (c)(1),
(2), (4) Date: Aug. 30, 2012

(87) PCT Pub. No.: WO2011/111861
PCT Pub. Date: Sep. 15, 2011

(65) Prior Publication Data
US 2012/0322005 A1   Dec. 20, 2012

(30) Foreign Application Priority Data

Mar. 12, 2010 (JP) ................... 2010-055883
Oct. 5, 2010 (JP) ................... 2010-225436

(51) Int. Cl.
*G03G 5/00* (2006.01)
*G03G 9/00* (2006.01)
*C08J 3/22* (2006.01)
*G03G 9/08* (2006.01)
*C08J 3/12* (2006.01)

(52) U.S. Cl.
CPC ............ *G03G 9/0806* (2013.01); *C08J 3/226* (2013.01); *G03G 9/0804* (2013.01); *C08J 2331/00* (2013.01); *G03G 9/081* (2013.01); *C08J 3/12* (2013.01); *G03G 9/0808* (2013.01)

USPC .............. 430/137.18; 430/108.11; 430/109.3; 430/109.4; 528/115; 528/192; 528/354

(58) Field of Classification Search
CPC ............ G03G 9/0802; G03G 9/0808; G03G 9/08702; G03G 9/08724; G03G 9/08755; G03G 9/08757; G03G 9/097
USPC ................. 430/137.18, 109.3, 109.4, 108.11; 528/115, 192, 354
See application file for complete search history.

(56) References Cited

U.S. PATENT DOCUMENTS 4,417,018 A    11/1983   Ogawa et al.
8,603,373 B2 *  12/2013   Ohtani et al. ............. 264/5

(Continued)

FOREIGN PATENT DOCUMENTS

CN    1980985 A    6/2007
JP    62-061235    12/1987

(Continued)

OTHER PUBLICATIONS

The Extended European Search Report issued Jul. 11, 2013, in Application No. / Patent No. 11753516.1—1303 / 2545104 PCT/JP2011056126.

(Continued)

*Primary Examiner* — Thorl Chea
(74) *Attorney, Agent, or Firm* — Oblon, Spivak, McClelland, Maier & Neustadt, L.L.P.

(57) ABSTRACT

A method for producing particles, including: bringing a compressive fluid into contact with a pressure plastic material, so as to plasticize the pressure plastic material; applying a shear force to the compressive fluid and the plasticized pressure plastic material, between which an interface exists, in the presence of a surfactant to granulate the pressure plastic material in the compressive fluid, so as to produce particles.

16 Claims, 7 Drawing Sheets

(56) References Cited

U.S. PATENT DOCUMENTS

| | | | |
|---|---|---|---|
| 2004/0161686 A1 | 8/2004 | Nakano et al. | |
| 2006/0222980 A1 | 10/2006 | Makino et al. | |
| 2007/0020548 A1 | 1/2007 | Tanaka et al. | |
| 2007/0059628 A1* | 3/2007 | Tanaka et al. | 430/110.4 |
| 2007/0202427 A1 | 8/2007 | Tanaka | |
| 2009/0162770 A1* | 6/2009 | Sako et al. | 430/105 |
| 2009/0180811 A1 | 7/2009 | Suganuma | |
| 2012/0112374 A1 | 5/2012 | Ohtani et al. | |
| 2012/0225377 A1 | 9/2012 | Yamauchi et al. | |

FOREIGN PATENT DOCUMENTS

| | | |
|---|---|---|
| JP | 2003-082216 | 3/2003 |
| JP | 2004-144778 | 5/2004 |
| JP | 2004-250693 | 9/2004 |
| JP | 2004-323727 | 11/2004 |
| JP | 2005-107405 | 4/2005 |
| JP | 2005-134497 | 5/2005 |
| JP | 2006-078895 | 3/2006 |
| JP | 2006-208934 | 8/2006 |
| JP | 2006-257354 | 9/2006 |
| JP | 2006-307168 | 11/2006 |
| JP | 2007-047691 | 2/2007 |
| JP | 2007-047752 | 2/2007 |
| JP | 2007-086469 | 4/2007 |
| JP | 2007-108694 | 4/2007 |
| JP | 4017996 | 9/2007 |
| JP | 2007-256941 | 10/2007 |
| JP | 4113452 | 4/2008 |
| JP | 4204882 | 10/2008 |
| JP | 2009-149723 A | 7/2009 |
| JP | 2009-151222 | 7/2009 |
| JP | 2009-157236 | 7/2009 |

OTHER PUBLICATIONS

International Search Report Issued Apr. 19, 2011 in PCT/JP2011/056126 Filed Mar. 9, 2011.

Office Action issued on Jan. 24, 2014 in the corresponding Korean Patent Application No. 10-2012-7026362 (with English Translation).

Chinese Office Action dated Jun. 27, 2014, issued in corresponding Chinese patent application No. 201180023691.1 (with partial English translation).

* cited by examiner

PARTICLES AND METHOD FOR PRODUCING THE SAME, TONER AND METHOD FOR PRODUCING THE SAME, DEVELOPER, PROCESS CARTRIDGE, IMAGE FORMING METHOD AND IMAGE FORMING APPARATUS

CROSS-REFERENCE TO RELATED APPLICATIONS

This application is a National Stage of PCT/JP2011/056126 filed on Mar. 9, 2011. This application is based upon and claims the benefit of priority to Japanese Application No. 2010-055883 filed on Mar. 12, 2010, and to Japanese Application No. 2010-225436 filed on Oct. 5, 2010.

BACKGROUND OF THE INVENTION

1. Technical Field

The present invention relates to particles and a method for producing particles, using a method for plasticizing a pressure plastic material with a compressive fluid, a toner containing the pressure plastic material, and a method for producing a toner, a developer containing the toner, a process cartridge, an image forming method, and an image forming apparatus, using the toner.

2. Background Art

Resins are roughly classified into thermoplastic resins and thermosetting resins. The thermoplastic resins are formed of a solid chain polymer, and reversibly repeat softening (plasticizing) by heating and curing by cooling. Examples of the thermoplastic resins include polyethylene, polypropylene, and polyvinyl chloride. On the other hand, the thermosetting resins have three dimensionally crosslinked network structures, and are solidified by curing reaction caused by heating two liquid components. Examples of the thermosetting resins include phenol resins, urea resins, unsaturated polyester resins, epoxy resins, and polyurethane. The thermoplastic resins and the thermosetting resins are respectively processed based on physical properties of the respective resins.

The thermoplastic resins have been processed by heating the thermoplastic resins at a temperature equal to or higher than the glass transition temperature (Tg) for plasticization, or heating the thermoplastic resins at a temperature equal to or higher than the melting point for melting, in order to decrease viscosity, and emulsify the thermoplastic resins in a fluidized state. However, there are many problems as follows: cost increases by the heat treatment; durability of the thermoplastic resin decreases due to degradation thereof, molecular weight of the thermoplastic resin decreases due to cutting of a molecular chain thereof; the thermoplastic resin is colored or decreases its transparency due to oxidation thereof, and the like (For example, see PTLs 1 to 5).

Particularly, in polymerized products obtained by polymerizing a ring-opening monomer, a molecular chain is easily cut due to back-biting in a melted state, and a decomposed product causes to form a foreign matter upon formation and to deteriorate the physical properties of a resin (a glass transition temperature and a melt viscosity), and significantly degrading molding processability and heat stability (NPL 1). Examples of the polymerized products obtained by polymerizing a ring-opening monomer include polylactic acid formed using lactide as a starting material, and polycaprolactone formed using ε-caprolactone as a starting material. These are classified into polyesters. Of these, polylactic acid has been desired to use as resin particles including use as a toner, because lactide (cyclic diester) as the starting material can be produced from a natural product, and is a plastic having balanced hue and mechanical strength.

As an exemplary product using the thermoplastic resin is a toner. In order to produce such toner, it is necessary to heat a toner material at a temperature higher than a glass transition temperature or melting point of the thermoplastic resin which is included in the toner (see PTLs 6 and 7). The heat treatment for toner production causes high cost, and degradation of the thermoplastic resin contained in the toner, causing decrease in durability thereof, and variation in molecular weight distribution thereof. These cause degradation of basic properties of the toner, such as charging ability, fixing ability, heat resistant storage stability (variation with time).

Therefore, in the present situation, a toner, which has excellent basic properties such as charging, variation with time, and the like, can reduce environmental load without generating waste liquid upon production, and can produce at low cost with no drying needed for production thereof, has not been provided yet. There is a demand for developing a new method for plasticizing a resin, and a method for producing a toner using the method for plasticizing a resin.

CITATION LIST

Patent Literature

PTL 1: Japanese Patent Application Laid-Open (JP-A) No. 2003-82216
PTL 2: JP-A No. 2006-208934
PTL 3: Japanese Patent Application Publication (JP-B) No. 62-61235
PTL 4: JP-A No. 2009-157236
PTL 5: JP-A No. 2009-151222
PTL 6: JP-A No. 2004-323727
PTL 7: Japanese Patent (JP-B) No. 4113452

Non-Patent Literature

NPL 1: "Polylactic acid", p. 107, Apr. 11, 2008, published by Yoneda Publisher. Inc.

SUMMARY OF INVENTION

Technical Problem

The present invention is aimed to provide particles and a method for producing particles, using a method for plasticizing a pressure plastic material, which can plasticize the pressure plastic material at a temperature lower than the temperature used in the conventional method; a toner, which has excellent basic properties such as charging, variation with time, and the like, can reduce environmental load without generating waste liquid upon production, and can be produced at low cost with no drying needed for production thereof; a method for producing the toner; a developer, a process cartridge, an image forming method and an image forming apparatus, using the toner.

Solution to Problem

The inventors of the present invention have been studied to solve the aforementioned problems, and found that an existing polymer ("pressure plastic material" in the present invention) can be plasticized without heating by bringing it into contact with a specific compressive fluid to which pressure is applied (see FIG. 7).

FIG. 7 is a graph having a glass transition temperature of polystyrene (the pressure plastic material) on the vertical axis and a pressure applied to carbon dioxide (compressive fluid) on the horizontal axis.

As shown in FIG. 7, there is a correlation between the glass transition temperature of the pressure plastic material and a pressure applied to carbon dioxide (compressive fluid), and the graph shows a negative inclination. The inclination varies depending on the type, composition, molecular weight of the pressure plastic material. For example, when the pressure plastic material is a polystyrene resin, the inclination is −9° C./MPa; when the pressure plastic material is a styrene-acrylic resin, the inclination is −9° C./MPa, and when the pressure plastic material is an amorphous polyester resin, the inclination is −8° C./MPa, when the pressure plastic material is a racemized polylactic acid of the amorphous polyester resin, the inclination is −25° C./MPa, and particularly major effect can be obtained. When the pressure plastic material is a crystalline polyester resin, the inclination is −2° C./MPa, when the pressure plastic material is a polyol resin, the inclination is −8° C./MPa, when the pressure plastic material is a polyurethane resin, the inclination is −7° C./MPa, when the pressure plastic material is a polyarylate resin, the inclination is −11° C./MPa, and when the pressure plastic material is a polycarbonate resin, the inclination is −10° C./MPa.

The inventors of the present invention have been found that, in the toner production, by using a compressive fluid instead of an aqueous or organic solvent which has been conventionally used, waste water or waste liquid is not generated, a remaining solvent is not contained in the toner, and drying energy is hardly needed.

Moreover, of the compressive fluid, particularly carbon dioxide (including supercritical carbon dioxide, liquefied carbon dioxide) is nonflammable and highly safe, and functions as a non-aqueous solvent, thus, using carbon dioxide (including supercritical carbon dioxide, liquefied carbon dioxide) in a toner production, a toner has a hydrophobic surface, and carbon dioxide can be collected for recycle because the carbon dioxide easily separated from the toner at normal temperature and normal pressure.

The present invention is based on the findings of the inventors of the present invention, and means for solving the problems are as follows.

<1> A method for producing particles, including: bringing a compressive fluid into contact with a pressure plastic material, so as to plasticize the pressure plastic material, applying a shear force to the compressive fluid and the plasticized pressure plastic material, between which an interface exists, in the presence of a surfactant to granulate the pressure plastic material in the compressive fluid, so as to produce particles.
<2> The method for producing particles according to <1>, wherein the surfactant contains at least one selected from a perfluoroalkyl group, a polydimethylsiloxane group, and a polyethylene glycol group, in a main chain or a side chain.
<3> The method for producing particles according to any of <1> and <2>, wherein the plasticized pressure plastic material has a viscosity at 25° C. of 500 mPa·s or lower.
<4> The method for producing particles according to any of <1> to <3>, wherein a temperature for plasticizing the pressure plastic material is lower than or equal to the thermal decomposition temperature of the pressure plastic material.
<5> The method for producing particles according to any of <1> to <4>, wherein the pressure plastic material is at least one selected from a polyester resin, a vinyl resin, a urethane resin, and a polycarbonate resin.
<6> The method for producing particles according to <5>, wherein each of the polyester resin and the polycarbonate resin is at least one selected from resins obtained by polymerizing a ring-opening monomer.
<7> The method for producing particles according to any of <1> to <6>, wherein the compressive fluid contains any of supercritical carbon dioxide and liquefied carbon dioxide.
<8> Particles obtained by the method for producing particles according to any of <1> to <7>.
<9> A method for producing a toner, including: bringing a compressive fluid into contact with a toner composition containing a pressure plastic material and a colorant, so as to plasticize the pressure plastic material, applying a shear force to the compressive fluid and the plasticized pressure plastic material, between which an interface exists, in the presence of a surfactant to granulate the toner composition in the compressive fluid, so as to produce a toner.
<10> The method for producing a toner according to <9>, wherein the surfactant contains at least one selected from a perfluoroalkyl group, a polydimethylsiloxane group, and a polyethylene glycol group, in a main chain or a side chain.
<11> The method for producing a toner according to any of <9> and <10>, wherein the plasticized pressure plastic material has a viscosity at 25° C. of 500 mPa·s or lower.
<12> The method for producing a toner according to any of <9> to <11>, wherein a temperature for plasticizing the pressure plastic material is lower than or equal to the thermal decomposition temperature of the pressure plastic material.
<13> The method for producing a toner according to any of <9> to <12>, wherein the pressure plastic material is at least one selected from a polyester resin, a vinyl resin, a urethane resin, and a polycarbonate resin.
<14> The method for producing a toner according to <13>, wherein each of the polyester resin and the polycarbonate resin is at least one selected from resins obtained by polymerizing a ring-opening monomer.
<15> The method for producing a toner according to any of <9> to <14>, wherein the compressive fluid contains any of supercritical carbon dioxide and liquefied carbon dioxide.
<16> A toner obtained by the method for producing the toner according to any of <9> to <15>.
<17> A developer containing the toner according to <16>.
<18> A process cartridge including: a latent electrostatic image bearing member; a developing unit configured to develop a latent electrostatic image using the toner according to <16>, so as to form a visible image on the latent electrostatic image bearing member, wherein the process cartridge is detachably attached to an image forming apparatus body.
<19> An image forming method including: forming a latent electrostatic image on a latent electrostatic image bearing member; developing the latent electrostatic image using the toner according to <16> so as to form a visible image; transferring the visible image on a recording medium; and fixing the transferred visible image on the recording medium.
<20> An image forming apparatus including: a latent electrostatic image bearing member; a latent electrostatic image forming unit configured to form a latent electrostatic image on the latent electrostatic image bearing member; a developing unit configured to develop the latent electrostatic image using the toner according to <16> so as to form a visible image; a transferring unit configured to transfer the visible image on a recording medium; and a fixing unit configured to fix the transferred visible image on the recording medium.

Advantageous Effects of Invention

According to the present invention, the conventional problems can be solved and the above-described object can be attained, and there can be provided a method for plasticizing a pressure plastic material, which can plasticize the pressure plastic material at a temperature lower than the temperature used in the conventional method; particles and a method for producing particles, using the method for plasticizing a pressure plastic material; a toner, which has excellent basic properties such as charging, variation with time, and the like, can reduce environmental load without generating waste liquid upon production, and can be produced at low cost with no drying needed for production thereof, a method for producing the toner; a developer, a process cartridge, an image forming method and an image forming apparatus, using the toner.

DESCRIPTION OF EMBODIMENTS

Method for Producing Particles and Particles

Figure 1:
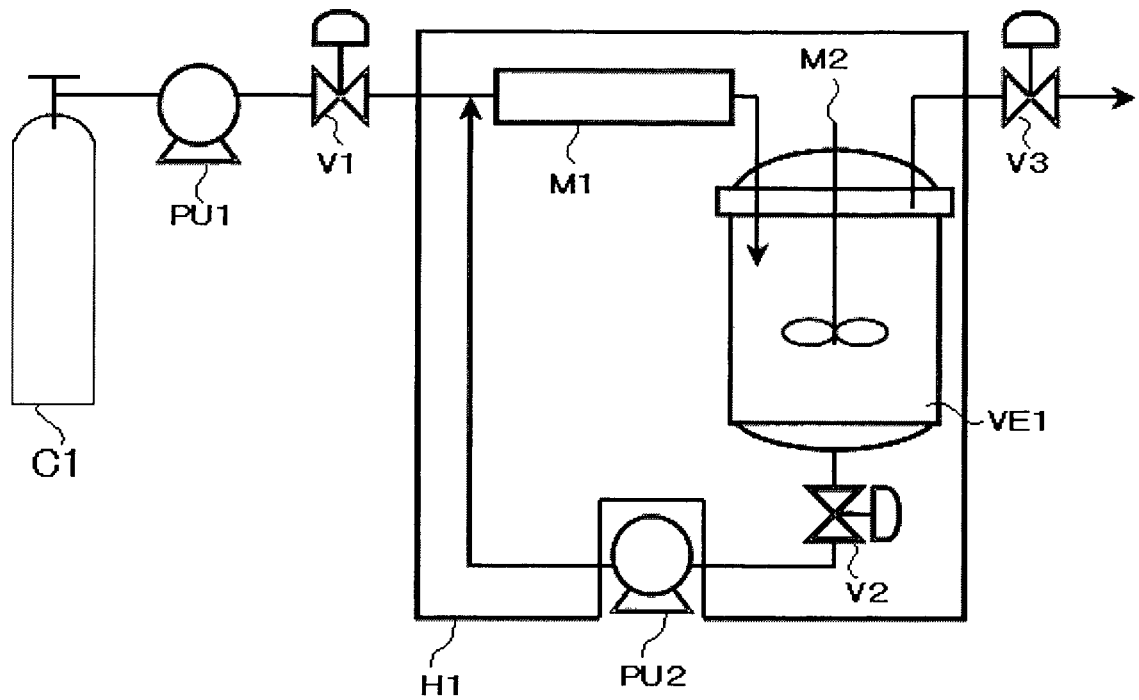
FIG. 1 shows an example of a granulation apparatus used in a method for producing a toner of the present invention.

A method for producing particles includes at least a plasticizing step and a particles forming step, and further includes appropriately selected other steps as necessary.

The particles of the present invention are produced by the method for producing particles of the present invention.

Hereinafter, the particles of the present invention will become apparent through the description of the method for producing particles of the present invention.

<Plasticizing Step>

The plasticizing step is a step of bringing a compressive fluid into contact with a pressure plastic material so as to plasticize the pressure plastic material.

A temperature for plasticizing the pressure plastic material is not particularly limited and may be appropriately selected depending on the intended purpose. It is preferably lower than or equal to a thermal decomposition temperature of the pressure plastic material in an atmospheric pressure, and more preferably lower than or equal to a melting point temperature thereof.

Here, the thermal decomposition temperature means that a temperature at which weight decrease starts by thermal decomposition of a sample in measurement using a thermal gravimetric analyzer (TGA).

When the temperature of plasticizing the pressure plastic material is higher than the thermal decomposition temperature of the pressure plastic material in an atmospheric pressure, the pressure plastic material may be degraded, and the durability of the pressure plastic material decreases, a molecular weight of the pressure plastic material decreases due to cutting of a molecular chain thereof, the pressure plastic material is colored or decreases in its transparency due to oxidation thereof, the fixing ability of a toner containing the pressure plastic material decreases, the heat-resistant storage stability of a toner containing the pressure plastic material decreases, the charging ability of a toner containing the pressure plastic material decreases, and cost increases by heat treatment.

<<Pressure Plastic Material>>

The pressure plastic material is not particularly limited and may be appropriately selected depending on the intended purpose, as long as the pressure plastic material is a material having a glass transition temperature, which decreases according to increase of pressure applied to the compressive fluid which is brought into contact with the pressure plastic material, namely, a negative inclination is indicated in a graph having the glass transition temperature of the pressure plastic material on the vertical axis and a pressure applied to the compressive fluid on the horizontal axis. Examples of the pressure plastic material include polyester resins, vinyl resins, urethane resins, polyol resins, polyamide resins, epoxy resins, rosins, modified rosins, terpene resins, phenol resins, aliphatic or alicyclic hydrocarbon resins, aromatic petroleum resins, chlorinated paraffin and paraffin wax, polyethylenes, and polypropylenes. These may be used alone or in combination. Of these, polyester resins, polyol resins, vinyl resins are particularly preferable.

The polyol resins mean polyether polyol resins having epoxy skeletons, and preferable examples thereof include (i) an epoxy resin, (ii) an alkylene oxide adduct of divalent phenol or glycidyl ether thereof, and (iii) a polyol obtained form a reaction of a compound having an active hydrogen reacting with an epoxy group.

The pressure plastic material is plasticized at a temperature lower than or equal to a glass transition temperature Tg of the pressure plastic material, by bringing the pressure plastic material into contact with the compressive fluid to which a pressure is applied.

The polyester resins are not particularly limited and may be appropriately selected depending on the intended purpose. Examples thereof include modified polyesters, unmodified polyesters, amorphous polyesters, and crystalline polyesters.

Particularly, the present invention is suitably used for a polyester resin and a polycarbonate resin, which are obtained by polymerizing a ring-opening monomer, in which molecular chain cutting easily occurs in a melted state due to back-biting.

Preferred monomers are, for example, cyclic dimers obtained by dehydration-condensating an L and/or D form of a compound represented by General Formula A:

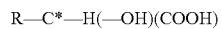  General Formula A in General Formula A, R represents a C1-C10 alkyl group.

Specific examples of the compound represented by General Formula A include enantiomers of lactic acid, enantiomers of 2-hydroxybutanoic acid, enantiomers of 2-hydroxypentanoic acid, enantiomers of 2-hydroxyhexanoic acid, enantiomers of 2-hydroxyheptanoic acid, enantiomers of 2-hydroxyoctanoic acid, enantiomers of 2-hydroxynonanoic acid, enantiomers of 2-hydroxydecanoic acid, enantiomers of 2-hydroxyundecanoic acid, and enantiomers of 2-hydroxydodecanoic acid. Of these, enantiomers of lactic acid are particularly preferred since they have high reactivity and are easily available. The cyclic dimers may be used alone or in combination.

As the other cyclic esters than those represented by General Formula A, known cyclic ester compounds can be used without restriction. Examples of the other cyclic esters than those represented by General Formula A include aliphatic lactones such as β-propiolactone, β-butyrolactone, γ-butyrolactone, γ-hexanolactone, γ-octanolactone, δ-valerolactone, δ-hexanolactone, δ-octanolactone, ε-caprolactone, δ-dodecanolactone, α-methyl-γ-butyrolactone, β-methyl-δ-valerolactone, glycolide and lactide. Of these, ε-caprolactone is particularly preferred since it has high reactivity and is easily available.

Other than the above-described esters, cyclic ethers, cyclic carbonates, cyclic amides (lactam) may be used. Examples of the cyclic ethers include tetrahydrofuran, examples of the cyclic carbonates include propylene carbonate, examples of the cyclic amides include ε-caprolactam, but not limited thereto.

The vinyl resins are not particularly limited and may be appropriately selected depending on the intended purpose. Examples thereof include polymers, copolymers, and mixtures thereof, such as styrene and polymers of substitution product thereof, for example, polystyrene, poly(p-chlorostyrene), and polyvinyltoluene; styrene copolymers, for example, a styrene-p-chlorostyrene copolymer, a styrene-propylene copolymer, a styrene-vinyltoluene copolymer, a styrene-vinylnaphthalene copolymer, a styrene-methyl acrylate copolymer, a styrene-ethyl acrylate copolymer, a styrene-butyl acrylate copolymer, a styrene-octyl acrylate copolymer, a styrene-methyl methacrylate copolymer, a styrene-ethyl methacrylate copolymer, a styrene-butyl methacrylate copolymer, a styrene-α-chloromethyl methacrylate copolymer, a styrene-acrylonitrile copolymer, a styrene-vinylmethylketone copolymer, a styrene-butadiene copolymer, a styrene-isoprene copolymer, a styrene-acrylonitrile-indene copolymer, a styrene-maleic acid copolymer, and a styrene-maleic acid ester copolymer; polymethyl methacrylate, polybutyl methacrylate, polyvinyl chloride, polyvinyl acetate, vinyl propionate, (meth)acrylamide, vinyl methyl ether, vinyl ethyl ether, vinyl isobutyl ether, vinyl methyl ketone, N-vinyl pyrrolidone, N-vinyl pyridine, and butadiene.

The urethane resin is not particularly limited and may be appropriately selected depending on the intended purpose.

<Compressive Fluid>

Figure 9:
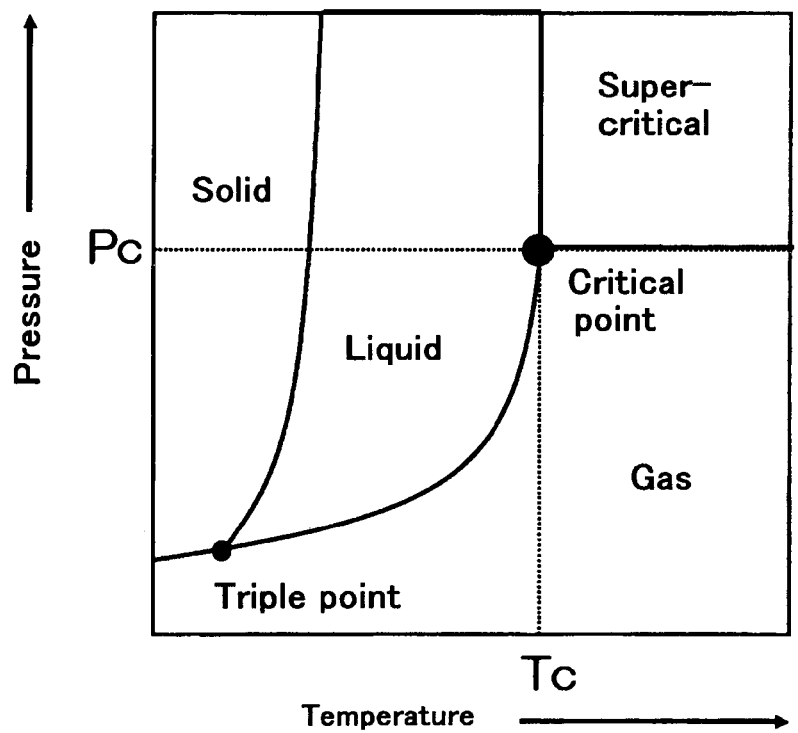
FIG. 9 is a general phase diagram showing the state of a substance varying depending on pressure and temperature conditions.
Figure 10:
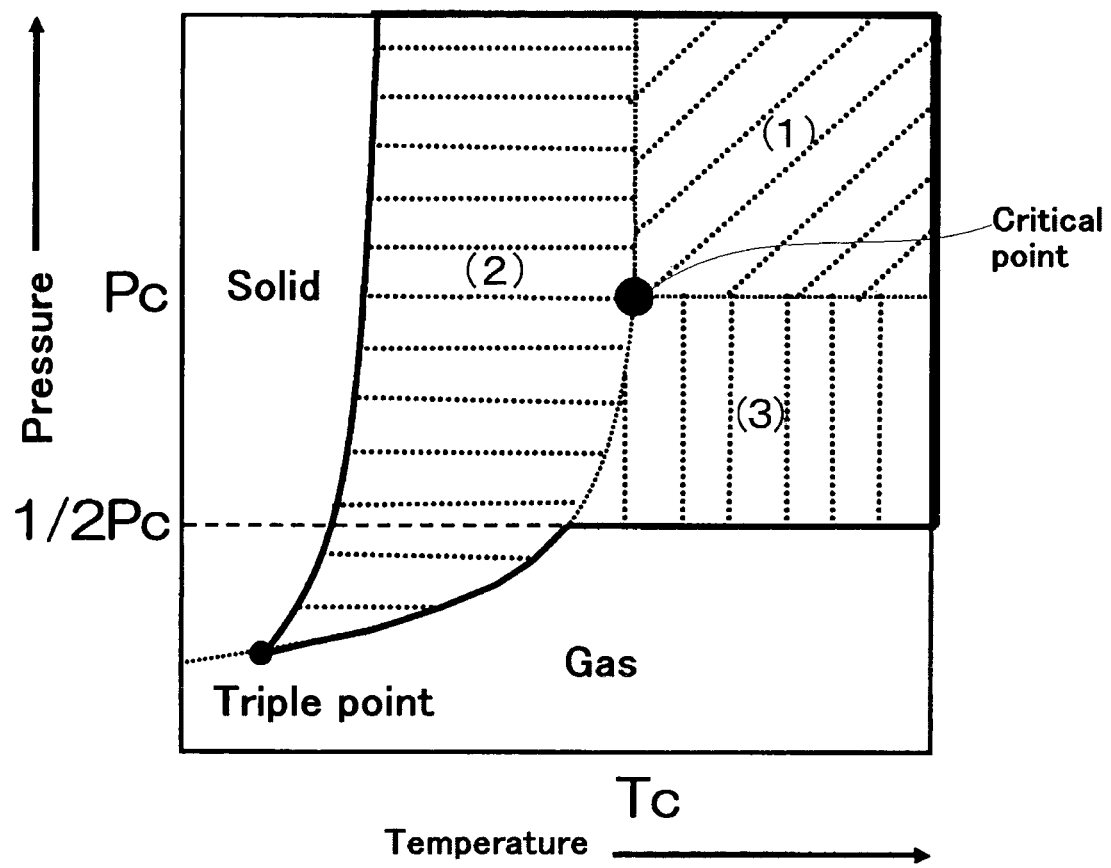
FIG. 10 is a phase diagram which defines a compressive fluid used in the present invention.

In the present invention, the "compressive fluid" refers to a substance present in any one of the regions (1), (2) and (3) of FIG. 10 in the phase diagram of FIG. 9.

In FIGS. 9 and 10, Pc and Tc denote a critical pressure and a critical temperature, respectively.

In such regions, the substance is known to have extremely high density and show different behaviors from those shown at normal temperature and normal pressure. Notably, the substance present in the region (1) is a supercritical fluid. The supercritical fluid is a fluid that exists as a noncondensable high-density fluid at a temperature and a pressure exceeding the corresponding critical points, which are limiting points at which a gas and a liquid can coexist. Also, the supercritical fluid does not condense even when compressed, and exists at a critical temperature or higher and a critical pressure or higher. Also, the substance present in the region (2) is a liquid, but in the present invention, is a liquefied gas obtained by compressing a substance existing as a gas at normal temperature (25° C.) and normal pressure (1 atm). Further, the substance present in the region (3) is a gas, but in the present invention, is a high-pressure gas whose pressure is ½ Pc or higher.

The compressive fluid is not particularly limited and may be appropriately selected depending on the intended purpose, as long as the substance is formed into fluid by applying a pressure. Examples thereof include supercritical fluid, subcritical fluid, and liquefied fluid. Of these, those containing carbon dioxide, such as supercritical carbon dioxide, subcritical carbon dioxide, and liquefied carbon dioxide are particularly preferable.

The pressure applied to the compressive fluid is not particularly limited and may be appropriately selected depending on the intended purpose. It is preferably 1 MPa or more, more preferably 2 MPa to 200 MPa, and particularly preferably 5 MPa to 100 MPa. When the pressure applied to the compressive fluid is less than 1 MPa, the obtainable effect of plasticization may be enough to fluidize the resin but not enough to granulate the resin. No matter how high the pressure is, no problem occurs. However, the higher the pressure is, the heavier an apparatus becomes, increasing cost.

When carbon dioxide is used as the compressive fluid, the pressure is preferably 3.7 MPa or higher, more preferably 5 MPa or higher, still more preferably 7.4 MPa (critical pressure) or higher.

<<<Supercritical Fluid and Subcritical Fluid>>>

The supercritical fluid means a fluid that has intermediate properties between a gas and a liquid, has properties such as being fast in mass transfer and heat transfer and being low in viscosity, and can continuously greatly change the density, dielectric constant, solubility parameter, free volume, and the like by changing the temperature and pressure. Furthermore, the supercritical fluid can even follow a minute undulation (surface) to wet the surface with the supercritical fluid (contact with the supercritical fluid) since it has an extremely small surface tension compared with those of organic solvents.

As the supercritical fluid, any supercritical fluid can be used without particular limitation as long as it is a fluid that exists as a noncondensable high-density fluid in a temperature and pressure region exceeding a limit (critical point) where a gas and a liquid can coexist, does not condensate when being compressed, and is in a state of a critical temperature or more and a critical pressure or more, and may be appropriately selected depending on the intended purpose. For example, a supercritical fluid having a low critical temperature and critical pressure is preferable. In addition, as the subcritical fluid, any subcritical fluid can be used without particular limitation as long as it exists as a high-pressure liquid and/or gas in a temperature and pressure region in the vicinity of the critical point, and may be appropriately selected depending on the intended purpose.

Examples of the supercritical fluid or subcritical fluid include carbon monoxide, carbon dioxide, nitrogen monoxide, ammonia, nitrogen, methane, ethane, propane, n-butane, isobutane, pentane, and chlorotrifluoromethane. Of these, carbon dioxide is particularly preferable since this can easily reach a supercritical state at a critical pressure of 7.3 MPa and a critical temperature of 31° C., is nonflammable and highly safe, allows to obtaining a toner having a hydrophobic surface as this is a nonaqueous solvent, and can be easily recovered and recycled as this is gasified by only restoring the pressure to a normal pressure, no drying is required for the resultant toner, and no liquid waste is produced and no residual monomer is contained therein.

For the supercritical fluid or the subcritical fluid, one of these may be used alone or two or more may be used in combination as a mixture. Moreover, organic solvent, such as alcohols (e.g., methanol, ethanol, propanol); ketones (e.g., acetone, methyl ethyl ketone); toluene, ethyl acetate, and tetrahydrofuran, may be added as an entrainer to the supercritical fluid or the subcritical fluid.

<<<Liquefied Fluid>>>

The liquefied fluid is not particularly limited and may be appropriately selected depending on the intended purpose. Examples thereof include liquefied carbon dioxide, liquefied methane, liquefied ethane, liquefied propane, and liquefied butane. Of these, liquefied carbon dioxide is preferable, because it is nonflammable and highly safe.

The liquefied fluid may be used alone or in combination as a mixture.

<Particles Forming Step>

The particles forming step is a step of applying a shear force to the compressive fluid and the plasticized pressure plastic material, between which an interface exists, in the presence of a surfactant to granulate the pressure plastic material in the compressive fluid, so as to produce particles.

<<<Surfactant>>>

The surfactant is not particularly limited and may be appropriately selected depending on the intended purpose, as long as it bears in a molecule moiety(s) that has an affinity to the compressive fluid and moiety(s) that has an affinity to the toner composition. In a case of supercritical $CO_2$, for example, compounds having bulky groups (e.g., groups containing a fluorine atom, groups containing a silicon atom, carbonyl groups, short-chain hydrocarbon groups, and propylene oxide) are preferable because they act as compounds having an affinity to $CO_2$. Of these, fluorine-containing compounds, silicon-containing compounds, carbonyl group-containing compounds, and polyethylene glycol (PEG) group-containing compounds are particularly preferable.

The fluorine-containing compounds are not particularly limited as long as they are compounds containing a perfluoroalkyl group having 1 to 30 carbon atoms; they may be either low-molecular weight compounds or high-molecular weight compounds. Of these, high-molecular weight fluorine-containing compounds are preferable in terms of their excellent surfactant potency and of excellent charging ability and durability of resultant toner particles.

Examples of the high-molecular weight fluorine-containing compounds include those expressed by the following Structural Formulas (A) and (B). Note, however, that such compounds may be homopolymers, block copolymers, or random copolymers in view of the affinity to the toner composition.

Structural Formula (A)

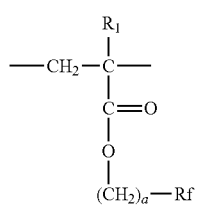

in Structural Formula (A), $R_1$ represents a hydrogen atom or a lower alkyl group having 1 to 4 carbon atoms, a represents an integer of 0 to 4, and Rf represents a perfluoroalkyl group having 1 to 30 carbon atoms or a perfluoroalkenyl group.

Structural Formula (B)

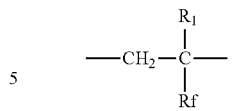

in Structural Formula (B), $R_1$ represents a hydrogen atom or a lower alkyl group having 1 to 4 carbon atoms, and Rf represents a perfluoroalkyl group having 1 to 30 carbon atoms or a perfluoroalkenyl group.

A number of chemical materials similar to the foregoing compounds containing a perfluoroalkyl group are commercially available (see catalogue by AZmax co.). Various fluorine-containing compounds can also be obtained using them.

The silicon-containing compounds are not particularly limited as long as they are compounds having a siloxane bond; they may be either low-molecular weight compounds or high-molecular weight compounds. Of these, compounds having a polydimethylsiloxane (PDMS) represented by the following Structural Formula (C) are preferable. Note, however, that such compounds may be homopolymers, block copolymers, or random copolymers in view of the affinity to the toner composition.

Structural Formula (C)

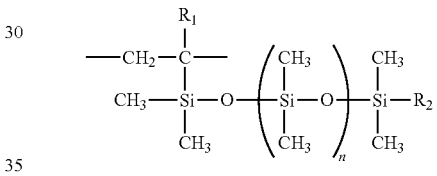

in Structural Formula (C), $R_1$ represents a hydrogen atom or a lower alkyl group having 1 to 4 carbon atoms, n represents a repeating unit, and $R_2$ represents a hydrogen atom, a hydroxyl group, or an alkyl group having 1 to 10 carbon atoms.

A number of chemical materials similar to the foregoing polydimethylsiloxanes are commercially available (see catalogue by AZmax co.). Various surfactants can also be obtained using them. Particularly, a silicon-containing compound (product name: Monasil PCA, manufactured by Croda International Plc) exhibits excellent granulating properties.

These fluorine-containing compounds and silicon-containing compounds can be produced by polymerization of polymerizable vinyl monomers that can be polymerized in a supercritical fluid (preferably supercritical carbon dioxide) in addition to conventional solvents.

The carbonyl group-containing compounds are not particularly limited and may be appropriately selected depending on the intended purpose. Examples thereof include aliphatic polyesters, polyacrylates and acrylic acid resins.

The polyethylene glycol (PEG) group-containing compounds are not particularly limited and may be appropriately selected depending on the intended purpose. Examples thereof include polyethylene glycol (PEG) group-containing polyacrylates, and polyethylene glycol resins.

The amount of the surfactant in the compressive fluid is preferably 0.01% by mass to 30% by mass, and more preferably 0.1% by mass to 20% by mass.

<<<Shear Force>>>

A method of applying a shear force is not particularly limited and may be appropriately selected depending on the intended purpose. Examples thereof include mechanical mixers, such as TK HOMO MIXER (manufactured by PRIMIX Corporation), T.K. HOMO DISPER (manufactured by PRIMIX Corporation), T.K. ROBOMIX (manufactured by PRIMIX Corporation), CAVITRON (manufactured by CAVITRON) and Ebara Milder (manufactured by EBARA CORPORATION); high-pressure homogenizers; various static mixers; and various micro mixers (for example, central collision turbulent mixers, swirl mixers).

The size of shear force (shear rate) is not particularly limited and may be appropriately selected depending on the intended purpose, as long as emulsification can be performed.

The shapes, sizes and materials of the particles of the present invention produced by the method for producing particles of the present invention are not particularly limited and may be appropriately selected depending on the intended purpose. Examples thereof include toner, raw materials for cosmetics, raw materials for pharmaceutical products, raw materials for foods, and raw materials for chemicals. Of these, toner is particularly preferable.

The particles of the present invention do not substantially contain an organic solvent.

(Toner and Method for Producing a Toner)

A method for producing a toner of the present invention includes at least a plasticizing step and a toner forming step, and further includes appropriately selected other steps as necessary.

A toner of the present invention is produced by the method for producing a toner of the present invention.

Hereinafter, through a description of the method for producing a toner of the present invention, the toner of the present invention will be specifically described.

<Plasticizing Step>

The plasticizing step is a step of bringing a compressive fluid to a toner composition so as to plasticize the pressure plastic material in the toner composition.

A temperature for plasticizing the pressure plastic material is not particularly limited and may be appropriately selected depending on the intended purpose. It is preferably lower than or equal to a thermal decomposition temperature of the pressure plastic material in an atmospheric pressure, and more preferably lower than or equal to a melting point temperature thereof.

Here, the thermal decomposition temperature means that a temperature at which mass decrease starts by thermal decomposition of a sample in measurement using a thermal gravimetric analyzer (TGA).

When the temperature of plasticizing the pressure plastic material is higher than the thermal decomposition temperature of the pressure plastic material in an atmospheric pressure, the pressure plastic material may be degraded, and the durability of the pressure plastic material decreases, a molecular mass decreases due to cutting of a molecular chain thereof, the pressure plastic material is colored or decreases in its transparency due to oxidation thereof, the fixing ability of a toner containing the pressure plastic material decreases, the heat-resistant storage stability of a toner containing the pressure plastic material decreases, the charging ability of a toner containing the pressure plastic material decreases, and cost increases by heat treatment.

<<Toner Composition>>

The toner composition contains at least a pressure plastic material and a colorant, and further contains a surfactant, a dispersant, a releasing agent, a charge controlling agent, and a crystalline polyester resin, which function in the compressive fluid, and if necessary further contains appropriately selected other components.

<<<Pressure Plastic Material>>>

The pressure plastic material is as described above.

<<<Colorant>>>

The colorants is not particularly limited and may be appropriately selected from known dyes and pigments depending on the intended purpose; examples thereof include carbon blacks, nigrosine dyes, iron black, Naphthol Yellow S, Hansa Yellow (10G, 5G, G), cadmium yellow, yellow iron oxide, yellow ocher, chrome yellow, Titan Yellow, Polyazo Yellow, Oil Yellow, Hansa Yellow (GR, A, RN, R), Pigment Yellow L, Benzidine Yellow (G, GR), Permanent Yellow (NCG), Vulcan Fast. Yellow (5G, R), Tartrazine Lake, Quinoline Yellow Lake, anthracene yellow BGL, isoindolinone yellow, colcothar, red lead oxide, lead red, cadmium red, cadmium mercury red, antimony red, Permanent Red 4R, Para Red, Fiser Red, parachloroorthonitroaniline red, Lithol Fast Scarlet G, Brilliant Fast Scarlet, Brilliant Carmine BS, Permanent Red (F2R, F4R, FRL, FRLL, F4RH), Fast Scarlet VD, Vulcan Fast Rubine B, Brilliant Scarlet G, Lithol Rubine GX, Permanent Red FSR, Brilliant Carmine 6B, Pigment Scarlet 3B, Bordeaux 5B, Toluidine Maroon, Permanent Bordeaux F2K, Helio bordeaux BL, bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, victoria blue lake, metal-free phthalocyanine blue, phthalocyanine blue, fast sky blue, indanthrene blue (RS, BC), indigo, ultramarine blue, iron blue, anthraquinone blue, fast violet B, methylviolet lake, cobalt purple, manganese violet, dioxane violet, anthraquinone violet, chrome green, zinc green, chromium oxide, viridian green, emerald green, pigment green B, naphthol green B, green gold, acid green lake, malachite green lake, phthalocyanine green, anthraquinone green, titanium oxide, zinc flower, lithopone, and the like. These may be used alone or in combination.

The dyes are not particularly limited and may be appropriately selected depending, on the intended purpose. Examples thereof include C.I. SOLVENT YELLOW (6, 9, 17, 31, 35, 100, 102, 103, 105), C.I. SOLVENT ORANGE (2, 7, 13, 14, 66), C.I. SOLVENT RED (5, 16, 17, 18, 19, 22, 23, 143, 145, 146, 149, 150, 151, 157, 158), C.I. SOLVENT VIOLET (31, 32, 33, 37), C.I. SOLVENT BLUE (22, 63, 78, 83 to 86, 191, 194, 195, 104, C.I. SOLVENT GREEN (24, 25), C.I. SOLVENT BROWN (3, 9).

Commercially available dyes are not particularly limited and may be appropriately selected depending on the intended purpose. Examples thereof include Aizen SOT dyes such as Yellow-1, 3, 4, Orange-1, 2, 3, Scarlet-1, Red-1, 2, 3, Brown-2, Blue-1, 2, Violet-1, Green-1, 2, 3, and Black-1, 4, 6, 8 (manufactured by Hodogaya Chemical Co., Ltd.); Sudan dyes such as Yellow-146, 150, Orange-220, Red-290, 380, 460, and Blue-670 (manufactured by BASF); Diaresin Yellow-3G, F, H2G, HG, HC, HL, Diaresin Orange-HS, G, Diaresin Red-GG, S, HS, A, K, H5B, Diaresin Violet-D, Diaresin Blue-J, G, N, K, P, H3G, 4G, Diaresin Green-C, and Diaresin Brown-A (manufactured by Mitsubishi Chemical Industries. Ltd.); Oil Color Yellow-3G, GG-S, #105, Oil Color Orange-PS, PR, #201, Oil Color Scarlet-#308, Oil Color Red-5B, Oil Color Brown-GR, #416, Oil Color Green-BG, #502, Oil Color Blue-BOS, IIN, and Oil Color Black-HBB, #803, EB, EX (manufactured by Orient Chemical Industries, Ltd.); Sumiplast Blue-GP, OR, Sumiplast Red-FB, 3B, and Sumiplast Yellow FL7G, GC (manufactured by Sumitomo Chemical Co., Ltd.); and Kayaron Polyester Black EX-SF300, Kayaset Red-B, and Kayaset Blue-A-2R (manufactured by Nippon Kayaku Co., Ltd).

The amount of the colorant is not particularly limited and may be appropriately selected depending on a coloring degree. It is preferably 1 part by mass to 50 parts by mass, relative to 100 parts by mass of the pressure plastic material.

<<<Surfactant>>>

Examples of the surfactants include fluorochemical surfactants, silicone surfactants, and PEG surfactants. These are compounds each contain at least a perfluoroalkyl group (Rf group), a polydimethylsiloxane group (PDMS group), a polyethylene glycol group (PEG group) or the like in a main chain or a side chain. These may be in a form of oligomer or polymer.

Specific examples of the surfactants include homopolymers obtained by polymerization of a Rf group-containing vinyl monomer, a PDMS group-containing vinyl monomer, a PEG group-containing vinyl monomer, etc.; copolymers of the aforementioned vinyl monomer and the other vinyl monomer. Examples of the vinyl monomers include styrene monomers, acrylate monomers, and methacrylate monomers.

Moreover, the surfactant having a Rf group, a PDMS group, and a PEG group as a main chain of an oligomer or a polymer, in which a COOH group, an OH group, an amino group, or a pyrrolidone skeleton is introduced into a side chain, may be used. However, the surfactants are not limited thereto.

There are many commercially available vinyl monomers, and these may be used depending on the intended purpose.

An example of the fluorochemical surfactant is represented by the following General Formula 1.

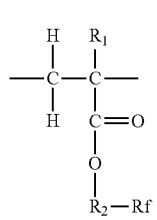

General Formula 1

In General Formula 1, $R_1$ denotes a hydrogen atom, a methyl group, or a lower alkyl group having 2 to 4 carbon atoms (such as an ethyl group, a propyl group, an isopropyl group, a n-butyl group, a sec-butyl group, a tert-group, and the like); $R_2$ denotes a methylene group, an ethylene group, or an alkylene group (such as a propylene group, an isoprene group, a 2-hydroxypropyl group, a butylene group, a 2-hydroxybutylene group and the like); Rf denotes a perfluoroalkyl group having 7 to 10 carbon atoms, a perfluoroalkyl group having 1 to 6 carbon atoms, or a perfluoroalkyl group having 11 to 20 carbon atoms. Of these, it is preferred that $R_1$ denote a hydrogen atom or a methyl group; that $R_2$ denote a methylene group or an ethylene group; and that Rf denote a perfluoroalkyl group having 7 to 10 carbon atoms.

Generally used fluorine group-containing surfactants are produced in such a manner that a fluorine vinyl monomer is polymerized in a fluorine solvent such as HCFC225. However, it is more preferred that instead of HCFC225, a supercritical carbon dioxide be used as a reaction solvent for synthesizing the fluorine group-containing surfactant, in terms of reducing an environmental load. Specifically, a method described in "Handbook of fluororesin" (edited by Takaomi Satokawa, published by Nikkan Kogyo Shimbun Ltd.) pp. 730 to 732, may be used.

<<<Dispersant>>>

The dispersant is not particularly limited and may be appropriately selected depending on the intended purpose. Examples thereof include organic fine particles and inorganic fine particles. Of these, acrylic-modified inorganic fine particles, silicone-modified inorganic fine particles, fluorine-modified inorganic fine particles, fluorine-containing organic fine particles, and silicone-containing organic fine particles are preferable. Of these, acrylic-modified inorganic fine particles are more preferable. The dispersant is preferably dissolved in the compressive fluid.

Examples of the organic fine particles include silicone-modified acrylic fine particles and fluorine-modified acrylic particles, which are insoluble in supercritical fluids.

Examples of the inorganic fine particles include polyvalent metal phosphates such as calcium phosphate, magnesium phosphate, aluminum phosphate, and zinc phosphate; carbonates such as calcium carbonate, and magnesium carbonate; inorganic salts such as calcium metasilicate, calcium sulfate, barium sulfate; inorganic oxides such as calcium hydroxide, magnesium hydroxide, aluminium hydroxide, silica, titanium oxide, bentonite, and alumina. Of these, silica is preferable.

As the exemplary acrylic-modified inorganic fine particles, there are surface modified inorganic fine particles obtained by modifying an OH group remaining on a surface of an inorganic fine particle with a fluorine atom-containing silane coupling agent.

Here, as an example, the reaction formula below shows that silica is subjected to surface modification using 3-(Trimethoxysil)propyl methacrylate. However, other methods may be used as long as these methods provide the acrylic-modified inorganic fine particles.

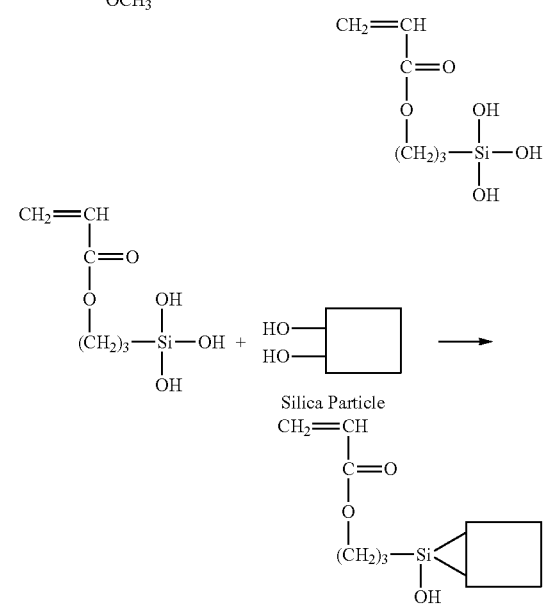

The acrylic-modified inorganic fine particles obtained by the above-described method have high affinity to supercritical carbon dioxide with its Si portion and high affinity to a toner composition with its acrylate portion. Specific examples of the fluorine atom-containing silane coupling agents are shown below.

(1) $CF_3(CH_2)_2SiCl_3$
(2) $CF_3(CF_2)_5SiCl_3$
(3) $CF_3(CF_2)_5(CH_2)_2SiCl_3$
(4) $CF_3(CF_2)_7(CH_2)_2SiCl_3$
(5) $CF_3(CF_2)_7CH_2CH_2Si(OCH_3)_3$
(6) $CF_3(CF_2)_7(CH_2)_2Si(CH_3)Cl_2$
(7) $CF_3(CH_2)_2Si(OCH_3)_3$
(8) $CF_3(CH_2)_2Si(CH_3)(OCH_3)_2$
(9) $CF_3(CF_2)_3(CH_2)_2Si(OCH_3)_3$
(10) $CF_3(CF_2)_5CONH(CH_2)_2Si(OC_2H_5)_3$
(11) $CF_3(CF_2)_4COO(CH_2)_2Si(OCH_3)_3$
(12) $CF_3(CF_2)_7(CH_2)_2Si(OCH_3)_3$
(13) $CF_3(CF_2)_7(CH_2)_2Si(CH_3)(OCH_3)_2$
(14) $CF_3(CF_2)_7SO_2NH(CH_2)_3Si(OC_2H_5)_3$
(15) $CF_3(CF_2)_8(CH_2)_2Si(OCH_3)_3$

The amount of the dispersant in the toner composition is preferably 0.1% by mass to 30% by mass, and more preferably 0.2% by mass to 20% by mass. The dispersant is preferably used alone, but may be used in combination with a surfactant in light of controlling toner particle diameters and toner charging ability.

<<<Releasing Agent>>>

The releasing agent is not particularly limited and may be appropriately selected from those known in the art depending on the intended purpose. For example, waxes are suitably used.

Examples of the waxes include low-molecular weight polyolefin waxes, synthesized hydrocarbon waxes, natural waxes, petroleum waxes, high fatty acids and metal salts thereof, high fatty acid amides, and modifications of these waxes. These may be used alone or in combination.

Examples of the low-molecular weight polyolefin waxes include low-molecular weight polyethylene waxes and low-molecular weight polypropylene waxes.

Examples of the synthesized hydrocarbon waxes include Fischer-Tropsh wax.

Examples of the natural waxes include bee waxes, carnauba waxes, candelilla waxes, rice waxes, and montan waxes.

Examples of the petroleum waxes include paraffin waxes, and microcrystalline waxes.

Examples of the high fatty acids include stearic acid, palmitic acid, and myristic acid.

The melting point of the releasing agent is not particularly limited and may be appropriately selected depending on the intended purpose. The melting point of the releasing agent is preferably 40° C. to 160° C., more preferably 50° C. to 120° C., and still more preferably 60° C. to 90° C.

When the melting point of the releasing agent is lower than 40° C., the wax may adversely affect thermal stability. When the melting point of the releasing agent is higher than 160° C., it is likely that cold offset may occur during a low-temperature fixing process, and a paper sheet may wind itself around the fixing device.

The amount of the releasing agent in the toner is not particularly limited and may be appropriately selected depending on the intended purpose. It is preferably 1 part by mass to 20 parts by mass, and more preferably 3 parts by mass to 15 parts by mass, relative to 100 parts by mass of the pressure plastic material.

<<<Charge Controlling Agent>>>

The charge controlling agent is not particularly limited and may be appropriately selected from those known in the art. However, when a coloring material is used for the charge controlling agent, the toner may show different tones of color and, therefore, colorless materials or materials having color close to white are preferably used. Examples of the charge controlling agents include nigrosine dyes, triphenylmethane dyes, chrome-containing metal complex dyes, molybdic acid chelate pigments, rhodamine dyes, alkoxy amines, quaternary ammonium salts (including fluoride-modified quaternary ammonium salts), alkylamides, phosphorus or compounds thereof, tungsten or compounds thereof, fluorine-containing surfactants, metal salts of salicylic acid, and metal salts of salicylic acid derivatives. Of these, metal salts of salicylic acid, and metal salts of salicylic acid derivatives are preferable. These may be used alone or in combination. The metals are not particularly limited and may be appropriately selected depending on the intended purpose. Examples of the metals include aluminum, zinc, titanium, strontium, boron, silicon, nickel, iron, chrome, and zirconium.

The charge control agent may be of commercially available ones. Specific examples thereof include quaternary ammonium salt BONTRON P-51, oxynaphthoic acid metal complex E-82, salicylic metal complex E-84, phenolic condensate E-89 (manufactured by Orient Chemical Industries Ltd.), molybdenum complex of quaternary ammonium salt TP-302 and TP-415, and metal complex of salicylic acid TN-105 (manufactured by Hodogaya Chemical Co., Ltd.), quaternary ammonium salt copy charge PSY VP2038, triphenylmethane derivatives copy blue PR, quaternary ammonium salt copy charge NEG VP2036, copy charge NX VP434 (manufactured by Hochst), LRA-901, boron complex LR-147 (manufactured by Japan Carlit Co., Ltd.), quinacridone, azo pigment, and high-molecular-weight-compounds having sulfonic acid group, carboxyl group, or quaternary ammonium salt group.

The amount of the charge controlling agent is not particularly limited and may be appropriately determined depending on the intended purpose. The amount of the charge controlling agent is preferably 0.5 parts by mass to 5 parts by mass and, more preferably 1 part by mass to 3 parts by mass, relative to 100 parts by mass of the pressure plastic material. When the amount is less than 0.5 parts by mass, the charging ability of the toner may be adversely affected. When the amount is more than 5 parts by mass, the charging ability of the toner becomes exceedingly enhanced, decreasing the effect of the charge controlling agent primarily used. Thus, an electrostatic suction force that presses toner against developing rollers increases, causing decrease in the flowability of the developer and image density.

<<<Crystalline Polyester Resin>>>

The crystalline polyester resin is not particularly limited and may be appropriately selected from those known in the art depending on the intended purpose. In view of the fact that a crystalline polyester resin having a sharp molecular weight distribution and having a low molecular weight is excellent in achieving low-temperature fixing ability, preferably the crystalline polyester resin has a peak in the range of 3.5 to 4.0 on a log(M) scale, the half width of the peak of 1.5 or shorter on a log (M) scale, a weight average molecular weight (Mw) of 1,000 to 30,000, a number average molecular weight (Mn) of 500 to 6,000, and a ratio Mw/Mn of 2 to 8, when a molecular weight distribution of the crystalline polyester resin is obtained by subjecting to GPC the fraction of the crystalline polyester resin soluble in o-dichlorobenzene for subsequent analysis and the molecular weight distribution is expressed as a graph where the horizontal axis is given on a log(M) scale and the vertical axis is given on a % by mass scale.

Preferably, the melting temperature and the $F_{1/2}$ temperature of the crystalline polyester resin is low, as long as the heat-resistant storage stability is not impaired, and more preferably the temperature of the endothermic peak measured by DSC is in the range of 50° C. to 150° C. When the temperature of the endothermic peak measured by DSC is lower than 50° C., the heat-resistant storage stability may be degraded, and blocking may readily occur even at a temperature of the inside of the developing device. When the temperature of the endothermic peak measured by DSC is higher than 150° C., sufficient low-temperature fixing ability may not be obtained because the lower limit temperature for fixation becomes high.

An acid value of the crystalline polyester resin is not particularly limited, and may be appropriately selected depending on the intended purpose. It is preferably 5 mgKOH/g or more, and more preferably 10 mgKOH/g or more from the view point of increasing the affinity of the resin with paper and of achieving the intended low-temperature fixing ability. Moreover it is preferably 45 mgKOH/g or less from the view point of improving hot offset resistance.

Furthermore, the hydroxyl value of the crystalline polyester resin is preferably 0 mgKOH/g to 50 mgKOH/g, and more preferably 5 mgKOH/g to 50 mgKOH/g in terms of the low-temperature fixing ability and charging ability.

The amount of the crystalline polyester resin is not particularly limited, and may be appropriately selected depending on the intended purpose. It is preferably 900 parts by mass or less, more preferably 0.5 parts by mass to 500 parts by mass, and particularly more preferably 1 part by mass to 100 parts by mass, relative to 100 parts by mass of the pressure plastic material. When the amount of the crystalline polyester resin is less than 1 part by mass, the low temperature fixing ability may not exhibit. When the amount of the crystalline polyester resin is more than 900 parts by mass, hot offset resistance may be adversely affected.

<<<Other Components>>>

A flowability improver, one of the other components, means an agent that improves hydrophobic properties of resin particles through surface treatment and is capable of preventing reduction of the flowability and/or charging ability of resin particles even when exposed to high humidity environment. Examples of the flowability improver include silane coupling agents, sililating agents, silane coupling agents having a fluorinated alkyl group, organotitanate coupling agents, aluminum-based coupling agents, silicone oils, and modified silicone oils.

A cleaning improver, one of the other components, is added to the toner composition to remove a developer remaining on a photoconductor (also referred to as a latent electrostatic image bearing member) and/or on a primary transferring medium after a transferring step. Examples of the cleaning improver include metal salts of fatty acid such as zinc stearate, calcium stearate, stearic acid, and polymer particles prepared by soap-free emulsion polymerization such as polymethylmethacrylate particles and polyethylene particles. Among these, polymer particles having a relatively narrow particle size distribution are preferable, and polymer particles having a volume-average particle diameter of 0.01 to 1 μm are more preferable.

<<Compressive Fluid>>

The compressive fluid is as described above.

The compressive fluid can be readily isolated from the target product and can be recycled for reuse. Thus, by using the compressive fluid, it is possible to realize an epoch-making, environment-friendly toner production process that eliminates the need to use water and/or organic solvents as required in conventional processes.

The compressive fluid preferably contains a surfactant.

As the surfactant, the above-described surfactant can be used.

Additional fluids may be used together with the compressive fluid. For such additional fluids, those capable of facilitating control of the solubilities of the toner constituting materials are preferable. Suitable examples thereof include methane, ethane, propane, butane, and ethylene.

<Toner Forming Step>

The toner forming step is a step of applying a shear force to the compressive fluid and the plasticized pressure plastic material, between which an interface exists, in the presence of a surfactant to granulate the toner composition in the compressive fluid, so as to produce a toner.

<<Shear Force>>

A method of applying a shear force is not particularly limited and may be appropriately selected depending on the intended purpose. Examples thereof include mechanical mixers, such as TK HOMO MIXER (manufactured by PRIMIX Corporation), T.K. HOMO DISPER (manufactured by PRIMIX Corporation), T.K. ROBOMIX (manufactured by PRIMIX Corporation), CAVITRON (manufactured by CAVITRON) and Ebara Milder (manufactured by EBARA CORPORATION); high-pressure homogenizers; various static mixers; and various micro mixers (for example, central collision turbulent mixers, swirl mixers).

The size of shear force (shear rate) is not particularly limited and may be appropriately selected depending on the intended purpose, as long as emulsification can be performed.

Here, a method for granulating a toner using a granulation apparatus shown in FIG. 1 will be described.

In FIG. 1, a pressure-resistant reaction vessel VE1 with an observation window is charged with a toner composition, a surfactant, and the like, and a cover is closed, followed by closing all valves V1 to V3. The temperature of the pressure-resistant reaction vessel is raised to a certain temperature using a thermostatic bath H1.

Next, while inside of the pressure-resistant reaction vessel is slowly stirred using a mixer M2, the valve V1 is opened, followed by operating a $CO_2$ pump PU1 so as to introduce $CO_2$ from a $CO_2$ bomb C1 into the pressure-resistant reaction vessel until the pressure of the vessel reaches a certain pressure. Thereafter, the valve V1 is closed, the $CO_2$ pump PU1 is stopped, followed by visually confirming the state that the toner composition is sufficiently plasticized and fluidized. The state of the toner composition at this time is liquefied, but is not dissolved into $CO_2$, as well as having an interface between the toner composition and $CO_2$.

By opening the valve V2 and operating the circulation pump PU2, the plasticized and melted (liquefied) toner composition is granulated using a static mixer M1 and the mixer M2. The particle size is controlled in such a manner that while real-time observation is performed using a probe of a particle size measurement apparatus which is attached to the outside of the observation window of the pressure-resistant reaction vessel VE1, the flow rate of the circulation pump PU2 and rotation number of the mixer M2 are controlled to obtain a certain particle size.

After the granulation, the valve V2 is closed, the circulation pump PU2 is stopped, and the mixer M2 is returned to slow stirring. Then after the thermostatic bath is cooled to approximately room temperature, the valve V3 is opened to discharge $CO_2$, and then the cover is opened, followed by collecting the formed toner.

The discharged $CO_2$ is recovered by a recovering mechanism (not shown), and then recycled.

The toner of the present invention produced by the method for producing a toner does not substantially contain an organic solvent.

The shape, size, and the like of the toner are not particularly limited and may be appropriately determined depending on the intended purpose. The toner preferably has the following image density, average circularity, volume average particle diameter, ratio of volume average particle diameter to number average particle diameter (volume average particle diameter/number average particle diameter), etc.

The image density is preferably 1.9 or more, more preferably 2 or more, particularly preferably 2.1 or more, as determined using a spectrometer (X-Rite 938 Spectrodensitometer, manufactured by X-Rite, Incorporated).

When the image density is less than 1.9, the image density is low and high quality image may not be obtained.

The image density is measured as follows. Using IMAGIO NEO 450 (manufactured by Ricoh Company, Ltd.), a solid image is formed, with a toner-adhesion amount of 1.00 mg/cm$^2$±0.05 mg/cm$^2$, on copying paper TYPE 6000 <70W> (manufactured by Ricoh Company, Ltd.), while the surface temperature of the fixing roller being controlled to 160° C.±2° C. Image densities of arbitrarily selected six portions of the formed solid image are measured using a spectrometer (X-Rite 938 Spectrodensitometer, manufactured by X-Rite, Incorporated) to determine the average image density.

The average circularity is a value that the circumferential length of a circle that has an equivalent shape and an equivalent projected area to those of the toner is divided by the circumferential length of an actual particle, and not particularly limited and may be appropriately selected depending on the intended purpose. For example, the average circularity is preferably 0.9 to 0.98 and more preferably 0.95 to 0.975. Note that a toner containing 15% or less of particles that have an average circularity of less than 0.94 is preferable.

When the average circularity is less than 0.9, a high-quality image having satisfiable transferring property and causing no dust may not be obtained, and when more than 0.98, in an image forming system using blade cleaning technique, cleaning defects occur on the photoconductor and the transfer belt in the system, image smear, for example, in a case of formation of an image having a high-image area ratio such as photographic image, a toner forming an untransferred image due to a paper-feeding defect or the like accumulates on the photoconductor remains an untransferred toner thereon, and the untransferred toner may cause background smear on images, or a charging roller etc. that contact-charges the photoconductor is contaminated with the untransferred toner, thereby the toner may not exert its intrinsic charging ability.

The average circularity of toner particles can be measured using, for example, the flow particle image analyzer FPIA-2000, manufactured by Toa Medical Electronics Co., Ltd.

In the measurement, fine dust is removed from water using a filter, such that the number of particles inside a measured area (for example, 0.6 μm or larger but smaller than 159.21 μm in circle equivalent diameter) in $10^{-3}$ cm$^3$ of the water is 20 or fewer, then a few drops of a nonionic surfactant (preferably, CONTAMINON N, manufactured by Wako Pure Chemical Industries, Ltd.) are added into 10 mL of the water. Then 5 mg of a measurement sample is further added in the water, dispersion is carried out for 1 minute under conditions of 20 kHz and 50 W/10 cm$^3$ using the ultrasonic dispersing apparatus UH-50 (manufactured by SMT Co., Ltd.), dispersion is further carried out for a total of 5 minutes, and the particle size distribution of particles which are 0.6 μm or larger but smaller than 159.21 μm in circle equivalent diameter is measured using a sample dispersion liquid in which the measurement sample has a particle concentration of 4,000 number/$10^{-3}$ cm$^3$ to 8,000 number/$10^{-3}$ cm$^3$ (when particles belonging to the measurement circle equivalent diameter range are targeted).

The sample dispersion liquid is passed through a flow path (which widens with respect to the flow direction) of a flat, transparent flow cell (approximately 200 μm in thickness). To form an optical path which advances intersecting the thickness of the flow cell, a strobe and a CCD camera are provided so as to be positioned oppositely to each other with respect to the flow cell. A strobe light is emitted at intervals of 1/30 seconds to obtain images of particles flowing in the flow cell; as a result, the particles are photographed as two-dimensional images having certain areas which are parallel to the flow cell. Based upon the areas of the two-dimensional images of the particles, the diameters of circles having the same areas are calculated as circle equivalent diameters.

The circle equivalent diameters of 1,200 or more particles can be measured in approximately 1 minute, and the number of particles based upon the distribution of the circle equivalent diameters, and the proportion (number %) of particles having a prescribed circle equivalent diameter can be measured. The results (frequent % and cumulative %) can be obtained dividing the range of 0.06 μm to 400 μm into 226 channels (one octave is divided into 30 channels). The practical measurement of particles is carried out concerning particles which are 0.6 μm or lager but smaller than 159.21 μm in circle equivalent diameter.

The volume average particle diameter of the toner is not particularly limited and may be appropriately selected depending on the intended purpose. It is preferably 3 μm to 10 μm, more preferably 3 μm to 8 μm.

When the toner having a volume average particle diameter of less than 3 μm is used in a two-component developer, the toner may fuse and adhere to the carrier surface during long-term stirring in the developing device to thereby decrease charging ability of the carrier. On the other hand, when the toner having a volume average particle diameter of less than 3 μm is used in a one-component developer, the toner may tend to invite filming to a developing roller or adhesion to another member such as blade by thinning the toner layer. When the volume average particle diameter is more than 10 μm, the toner may not sufficiently yield high-quality images with a high resolution and may often show large variation in its particle diameter after consumption and addition of the toner in the developer.

The ratio Dv/Dn of the volume average particle diameter (Dv) to the number average particle diameter (Dn) in the toner is preferably 1 to 1.25, more preferably 1 to 1.1.

When the ratio (Dv/Dn) of the volume average particle diameter to the number average particle diameter is more than 1.25, in the case of a two-component developer, the toner fuses and adheres to the carrier surface during long-term stirring in the developing device to thereby decrease the charging ability of the carrier, and in the case of a one-component developer, the toner may tend to invite filming to the developing roller or adhesion to another member such as blade by thinning the toner layer. Moreover, the toner may not sufficiently yield high-quality images with a high resolution and may often show large variation in its particle diameter after consumption and addition of the toner in the developer.

The volume average particle diameter, and the ratio Dv/Dn of the volume average particle diameter to the number average particle diameter can be measured, for example, using a particle size analyzer Coulter Counter TA-II (manufactured by Beckman Coulter, Inc.).

(Developer)

The developer of the present invention contains at least the toner of the present invention, and may further contain appropriately selected other components such as a carrier. The developer may be, for example, a one-component developer, or a two-component developer. When used in, for example, high-speed printers which respond to increase in the recent information processing speed, it is preferably used as a two-component developer from the viewpoint of elongating its service life.

When the developer is as a one-component developer using the toner of the present invention, the developer of the present invention involves less change in diameter of each toner particle even after repetitive cycles of consumption and addition thereof, which prevents toner filming on a developing roller and toner adhesion on a member, such as a blade, for forming a thin toner layer. Thus, even when used (stirred) in a developing device for a long period of time, the developer maintains stable, excellent developability. Also, when the developer is a two-component developer using the toner of the present invention, the developer of the present invention involves less change in diameter of each toner particle in the developer even after long-term repetitive cycles of consumption and addition thereof. Thus, even when stirred in a developing device for a long period of time, the developer maintains stable, excellent developability.

<Carrier>

The carrier is not particularly limited and may be appropriately selected depending on the intended purpose. Nevertheless, preference is given to a carrier including a core material, and a resin layer that covers the core material.

The material for the core material is not particularly limited and may be appropriately selected from materials known in the art. For example, manganese-strontium (Mn—Sr) materials (50 emu/g to 90 emu/g) and manganese-magnesium (Mn—Mg) materials (50 emu/g to 90 emu/g) are preferable. In terms of securing appropriate image density, highly magnetized materials such as iron powder (100 emu/g or greater) and magnetite (75 emu/g to 120 emu/g) are preferable. In terms of the fact that the contact force on a photoconductor, where toner particles are disposed in an upright position, can be reduced and image quality can be advantageously improved, weakly magnetized materials such as copper-zinc (Cu—Zn) materials (30 emu/g to 80 emu/g) are preferable. These may be used alone or in combination.

The particle diameter of the core material as a volume average particle diameter is preferably 10 μm to 150 μm, more preferably 40 μm to 100 μm.

When the average particle diameter (volume average particle diameter ($D_{50}$)) is less than 10 μm, the amount of fine powder increases in the distribution of carrier particles, and this increase causes a decrease in magnetization per particle and thus possibly causes scattering of the carrier. When it is greater than 150 μm, the specific surface area of the carrier particles decreases, possibly causing scattering of the toner, and possibly degrading reproduction of solid portions in the case of full-color images that contain plenty of solid portions.

The material for the resin layer is not particularly limited and may be appropriately selected from resins known in the art, depending on the intended purpose. Examples thereof include amino resins, polyvinyl resins, polystyrene resins, halogenated olefin resins, polyester resins, polycarbonate resins, polyethylene resins, polyvinyl fluoride resins, polyvinylidene fluoride resins, polytrifluoroethylene resins, poly- hexafluoropropylene resins, copolymers of vinylidene fluoride and acrylic monomers, copolymers of vinylidene fluoride and vinyl fluoride, fluoroterpolymers (fluorinated triple (multiple) copolymers) such as a terpolymer composed of tetrafluoroethylene, vinylidene fluoride and a nonfluorinated monomer, and silicone resins. These may be used alone or in combination.

The amine resins include urea-formaldehyde resins, melamine resins, benzoguanamine resins, urea resins; polyamide resins, and epoxy resins. Examples of the polyvinyl resins include acrylic resins, polymethyl methacrylate resins, polyacrylonitrile resins, polyvinyl acetate resins, polyvinyl alcohol resins, and polyvinyl butyral resins. Examples of the polystyrene resins include polystyrene resins, and styrene-acrylic copolymers. Examples of the halogenated olefin resins include polyvinyl chloride. The polyester resins include polyethylene terephthalate resins, and a polybutylene terephthalate resins.

If necessary, the resin layer that covers the core material may contain conductive powder, etc. Examples of the conductive powder include metal powder, carbon blacks, titanium oxide, tin oxide and zinc oxide. The average particle diameter of any of these conductive powders is preferably 1 μm or less. When the average particle diameter is greater than 1 μm, it may be difficult to control electric resistance.

The resin layer that covers the core material can, for example, be formed by dissolving a silicone resin, etc. in a solvent so as to prepare a coating solution, then uniformly applying the coating solution over the surface of the core material by a coating method known in the art, which is followed by drying, and subsequently firing the dried coating solution. Examples of the coating method include immersion, spraying, and coating with the use of a brush.

The solvent is not particularly limited and may be appropriately selected depending on the intended purpose. Examples thereof include toluene, xylene, methyl ethyl ketone, methyl isobutyl ketone, cellosolve and butyl acetate.

The firing of the resin layer is not particularly limited and may be based upon external heating or internal heating. For example, the firing may be carried out in accordance with a method using a stationary electric furnace, a fluid-type electric furnace, a rotary electric furnace, a burner furnace, etc., or a method using a microwave.

The amount of the resin layer contained in the carrier is preferably 0.01% by mass to 5% by mass. When the amount is less than 0.01% by mass, it may be impossible to uniformly form the resin layer over the surface of the core material. When the amount is greater than 5% by mass, the resin layer is so thick that granulation among carrier particles occurs, possibly failing to obtain uniform carrier particles.

In the case where the developer is a two-component developer, the amount of the carrier contained in the two-component developer is not particularly limited and may be appropriately selected depending on the intended purpose. The amount of the carrier is preferably 90% by mass to 98% by mass, more preferably 93% by mass to 97% by mass.

Since the developer contains the toner of the present invention, the developer is excellent in charging ability and can stably form high quality images upon image formation.

The developer is suitably used for image formation by various known electrophotography, such as a magnetic one-component developing method, a non-magnetic one-component developing method, a two-component developing method, and the like, and particularly suitably used for a toner container, a process cartridge, an image forming apparatus, and an image forming method of the present invention, described below.

(Process Cartridge)

A process cartridge used in the present invention includes at least a latent electrostatic image bearing member configured to support a latent electrostatic image and a developing unit configured to develop a latent electrostatic image borne on the latent electrostatic image bearing member using a toner to form a visible image, and further includes other units appropriately selected as necessary.

The process cartridge can be detachably attached to an image forming apparatus body, and is excellent in convenience.

The developing unit includes at least a developer container configured to contain the toner and/or developer of the present invention and a developer bearing member configured to bear and convey the toner and/or developer contained in the developer container, and may further include a layer thickness control member configured to control the layer thickness of the toner to be borne on the developer bearing member, as necessary.

Figure 2:
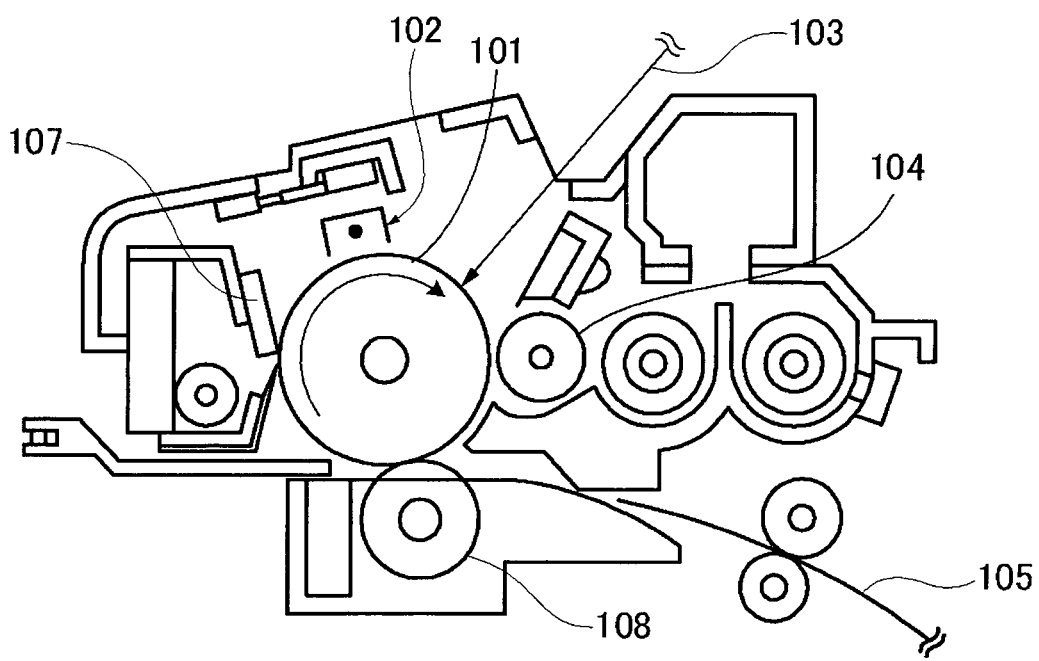
FIG. 2 is a schematic view showing an example of a process cartridge of the present invention.

Here, the process cartridge, for example, as shown in FIG. 2, houses a latent electrostatic image bearing member (photoconductor) 101, includes a charging unit 102, a developing unit 104, a transferring unit 108, and a cleaning unit 107, and further includes other members as necessary. In FIG. 2, reference numeral 103 denotes exposure by an exposing unit, for which a light source capable of writing at a high resolution is used, and reference numeral 105 denotes a recording medium.

Next, an image forming process conducted by the process cartridge of FIG. 2 will be described. While the photoconductor 101 rotates in the arrow direction, a latent electrostatic image corresponding to an exposure image is formed on the surface of the photoconductor by charging by the charging unit 102 and exposure 103 by the exposing unit (not shown). This latent electrostatic image is developed using a toner by the developing unit 104, and the developed visible image is transferred by the transferring unit 108 to the recording medium 105 and is printed. Subsequently, after the image is transferred to the recording medium the photoconductor surface is cleaned by the cleaning unit 107, and is further charge eliminated by a charge eliminating unit (not shown), and the above operations are repeated.

(Image Forming Method and Image Forming Apparatus)

An image forming method used in the present invention includes at least a latent electrostatic image forming step, a developing step, a transferring step, and a fixing step, and further includes other steps, for example, a charge eliminating step, a cleaning step, a recycling step, a controlling step, and the like, appropriately selected if necessary.

An image forming apparatus used in the present invention includes at least a latent electrostatic image bearing member, a latent electrostatic image forming unit, a developing unit, a transferring unit, and a fixing unit, and further includes other units, for example, a charge eliminating unit, a cleaning unit, a recycling unit, a controlling unit, and the like, appropriately selected as necessary.

The latent electrostatic image forming step is a step of forming a latent electrostatic image on the latent electrostatic image bearing member.

The latent electrostatic image bearing member (also referred to as "electrophotographic photoconductor" or "photoconductor") is not particularly limited in material, shape, structure, size, and the like, and may be appropriately selected from known ones. The shape is preferably a drum shape, and examples of the material include inorganic photoconductors such as amorphous silicon and selenium; and organic photoconductors (OPC) such as polysilane and phthalopolymethine. Of these, amorphous silicon or the like is preferable from the standpoint of a long life span.

The latent electrostatic image may be formed by uniformly charging the surface of the latent electrostatic image bearing member and then exposing its surface imagewise by the latent electrostatic image forming unit. The latent electrostatic image forming unit includes at least, for example, a charger that uniformly charges the surface of the latent electrostatic image bearing member and an exposing device that exposes the surface of the latent electrostatic image bearing member imagewise.

The charging may be carried out by applying voltage to the surface of the latent electrostatic image bearing member by use of the charger.

The charger is not particularly limited and may be appropriately selected depending on the intended purpose. Examples thereof include a contact charger which is known by itself provided with a conductive or semiconductive roll, brush, film, rubber blade, or the like, and a noncontact charger using a corona discharge such as a corotron or scorotron.

The exposure may be carried out by exposing the surface of the latent electrostatic image bearing member imagewise by use of the exposing device.

The exposing device is not particularly limited as long as it is capable of exposing imagewise on the surface of the latent electrostatic image bearing member which has been charged by the charger and may be appropriately selected depending on the intended purpose. Examples thereof include various exposing devices such as a copying optical system, a rod lens array system, a laser optical system, and a liquid crystal shutter optical system.

Here, in the present invention, a backlight system for exposing the latent electrostatic image bearing member imagewise from the rear surface side may be employed.

<Developing Step and Developing Unit>

The developing step is a step of developing the latent electrostatic image using the toner and/or developer of the present invention so as to form a visible image.

The visible image may be formed by developing the latent electrostatic image using the toner and/or developer of the present invention by the developing unit.

The developing unit is not particularly limited, as long as it is capable of developing using the toner and/or developer of the present invention and may be appropriately selected from known ones. For example, one that includes at least a developing device that contains the toner and/or developer of the present invention and is capable of supplying the toner and/or developer to the latent electrostatic image in a contact or noncontact manner is preferable, and a developing device equipped with the toner container is more preferable.

The developing device may employ either a dry developing system or a wet developing system, and may be either a single-color developing device or a multi-color developing device. Examples thereof include one including a stirrer that frictionally stirs the toner and/or developer so as to be charged and a rotatable magnet roller.

In the developing device, for example, the toner and the carrier are mixed and stirred, the toner is charged by friction at that time and is held in an upright position on the surface of the rotating magnet roller to form a magnetic brush. Since the magnet roller is arranged in the vicinity of the latent electrostatic image bearing member (photoconductor), a part of the toner constituting the magnetic brush formed on the surface of the magnet roller is moved to the surface of the latent electrostatic image bearing member (photoconductor) by an electrical suction force. As a result, the latent electrostatic image is developed with the toner to form a visible toner image on the surface of the latent electrostatic image The developer contained in the developer container is a developer containing the toner of the present invention. The developer may be a one-component developer or a two-component developer. The toner contained in the developer is the toner of the present invention.

<Transferring Step and Transferring Unit>

The transferring step is a step of transferring the visible image to a recording medium. It is preferable to primarily transfer the visible image onto the intermediate transfer medium using an intermediate transfer medium, and then secondarily transfer the visible image onto the recording medium, and it is more preferable that the transferring step includes a primary transfer step of transferring the visible image onto the intermediate transfer medium to form a composite transfer image using toners of two or more colors, preferably, full-color toner, and a secondary transfer step of transferring the composite transfer image onto a recording medium.

The transfer is carried out by, for example, charging the visible image onto the latent electrostatic image bearing member (photoconductor) using a transfer charger by means of the transferring unit. The transferring unit preferably includes a primary transferring unit configured to transfer the visible image onto the intermediate transfer medium to form a composite transfer image and a secondary transferring unit configured to transfer the composite transfer image onto the recording medium.

The intermediate transfer medium is not particularly limited and may be appropriately selected from ones known depending on the intended purpose, and examples thereof include a transfer belt.

The transferring unit (the primary transferring unit and the secondary transferring unit) preferably includes at least a transfer device that separates and charges the visible image formed on the latent electrostatic image bearing member (photoconductor) onto the recording medium side. One or a plurality of transferring units may be provided.

Examples of the transferring unit include a corona transfer device using corona discharge, a transfer belt, a transfer roller, a pressure transfer roller, and an adhesion transfer device.

Here, the recording medium is not particularly limited and may be appropriately selected from known recording media (recording paper).

<Fixing Step and Fixing Unit>

The fixing step is a step of fixing the transferred visible image onto the recording medium using a fixing device, and this may be carried out for toners of respective colors every time these are transferred to the recording medium or may be simultaneously carried out for the toners of respective colors in a laminated state at a time.

The fixing unit is not particularly limited and may be appropriately selected depending on the intended purpose, for example, a known heating pressure unit is preferably used. Examples of the heating pressure units include a combination of a heating roller and a pressure roller, and a combination of a heating roller, a pressure roller and an endless belt.

Usually, heating by the heating pressure unit is preferably at 80° C. to 200° C.

In the present invention, for example, a known optical fixing device may be used in combination with the fixing step and fixing unit or in place of these, depending on the intended purpose.

<Charge Eliminating Step and Charge Eliminating Unit>

The charge eliminating step is a step of charge eliminating by applying a charge eliminating bias to the latent electrostatic image bearing member by a charge eliminating unit.

The charge eliminating unit is not particularly limited as long as it can apply a charge eliminating bias to the latent electrostatic image bearing member, and may be appropriately selected from known charge eliminating devices. Examples thereof include charge eliminating lamps.

<Cleaning Step and Cleaning Unit>

The cleaning step is a step of removing the toner remaining on the latent electrostatic image bearing member and preferably carried out by a cleaning unit.

The cleaning unit is not particularly limited as long as it can remove the toner remaining on the latent electrostatic image bearing member, and may be appropriately selected from known cleaners. Examples thereof include a magnetic brush cleaner, an electrostatic brush cleaner, a magnetic roller cleaner, a blade cleaner, a brush cleaner, and a web cleaner.

<Recycling Step and Recycling Unit>

The recycling step is a step of recycling the toner removed by the cleaning step to the developing unit, and can be preferably carried out by a recycling unit.

The recycling unit is not particularly limited and may be appropriately selected from known conveying units.

<Controlling Step and Controlling Unit>

The controlling step is a step of controlling the respective steps, and can be preferably controlled by a controlling unit.

The controlling unit is not particularly limited as long as it is capable of controlling operations of the respective units, and may be appropriately selected depending on the intended purpose. Examples thereof include devices such as sequencers and computers.

Hereinafter, an embodiment in which the image forming method of the present invention is carried out by the above-mentioned image forming apparatus will be explained with reference to FIG. 3. An image forming apparatus 100 as shown in FIG. 3 includes a photoconductor drum 10 (hereinafter, referred to as photoconductor 10) serving as the latent electrostatic image bearing member, a charging roller 20 serving as the charging unit, exposure 30 by means of an exposing device serving as the exposing unit, a developing device 40 serving as the developing unit, an intermediate transfer medium 50, a cleaning device 60 serving as the cleaning unit having a cleaning blade, and a charge eliminating lamp 70 serving as the charge eliminating unit.

The intermediate transfer medium 50 is an endless belt, which is stretched around three rollers 51 so as to be movable in the arrow direction. A part of the three rollers 51 also functions as a transfer bias roller that is capable of applying a predetermined transfer bias (primary transfer bias) to the intermediate transfer medium 50. For the intermediate transfer medium 50, arranged in the vicinity thereof is a cleaning blade 90 for the intermediate transfer medium, and arranged opposing thereto is a transfer roller 80 serving as the transferring unit capable of applying a transfer bias to transfer (secondary transfer) a visible image (toner image) onto a recording medium 95. Around the intermediate transfer medium 50, arranged is a corona charger 58 for applying a charge to the visible image on the intermediate transfer medium 50, in the rotating direction of the intermediate transfer medium 50, between a contact portion between the photoconductor 10 and the intermediate transfer medium 50 and a contact portion between the intermediate transfer medium 50 and the recording medium 95.

The developing device 40 consists of a developing belt 41 serving as the developer bearing member and a black developing unit 45K, a yellow developing unit 45Y, a magenta developing unit 45M, and a cyan developing unit 45C provided side by side around the developing belt 41. The black developing unit 45K includes a developer containing portion 42K, a developer feed roller 43K, and a developing roller 44K. The yellow developing unit 45Y includes a developer containing portion 42Y, a developer feed roller 43Y, and a developing roller 44Y. The magenta developing unit 45M includes a developer containing portion 42M, a developer feed roller 43M, and a developing roller 44M. The cyan developing unit 45C includes a developer containing portion 42C, a developer feed roller 43C, and a developing roller 44C. In addition, the developing belt 41 is an endless belt, which is rotatably stretched around a plurality of belt rollers and a part of which contacts with the photoconductor 10.

Figure 3:
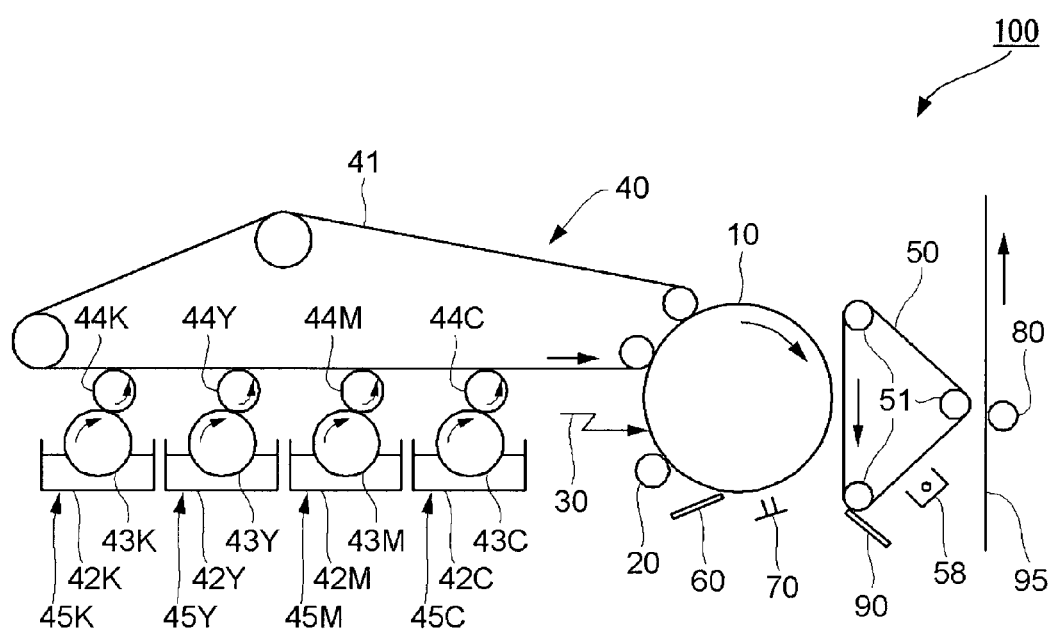
FIG. 3 is a schematic view showing an example of an image forming apparatus used in the image forming method of the present invention.

In the image forming apparatus 100 as shown in FIG. 3, for example, the charging roller 20 uniformly charges the photoconductor drum 10. The exposing device carries out exposure 30 imagewise on the photoconductor drum 10 to form a latent electrostatic image. The latent electrostatic image formed on the photoconductor drum 10 is developed by feeding a toner from the developing device 40 to form a visible image (toner image). The visible image (toner image) is transferred (primary transfer) onto the intermediate transfer medium 50 by a voltage applied from the rollers 51 and is further transferred (secondary transfer) onto the recording medium 95. As a result, a transfer image is formed on the recording medium 95. Here, a residual toner on the photoconductor 10 is removed by the cleaning device 60, and charging on the photoconductor 10 is once removed by the charge eliminating lamp 70.

Figure 4:
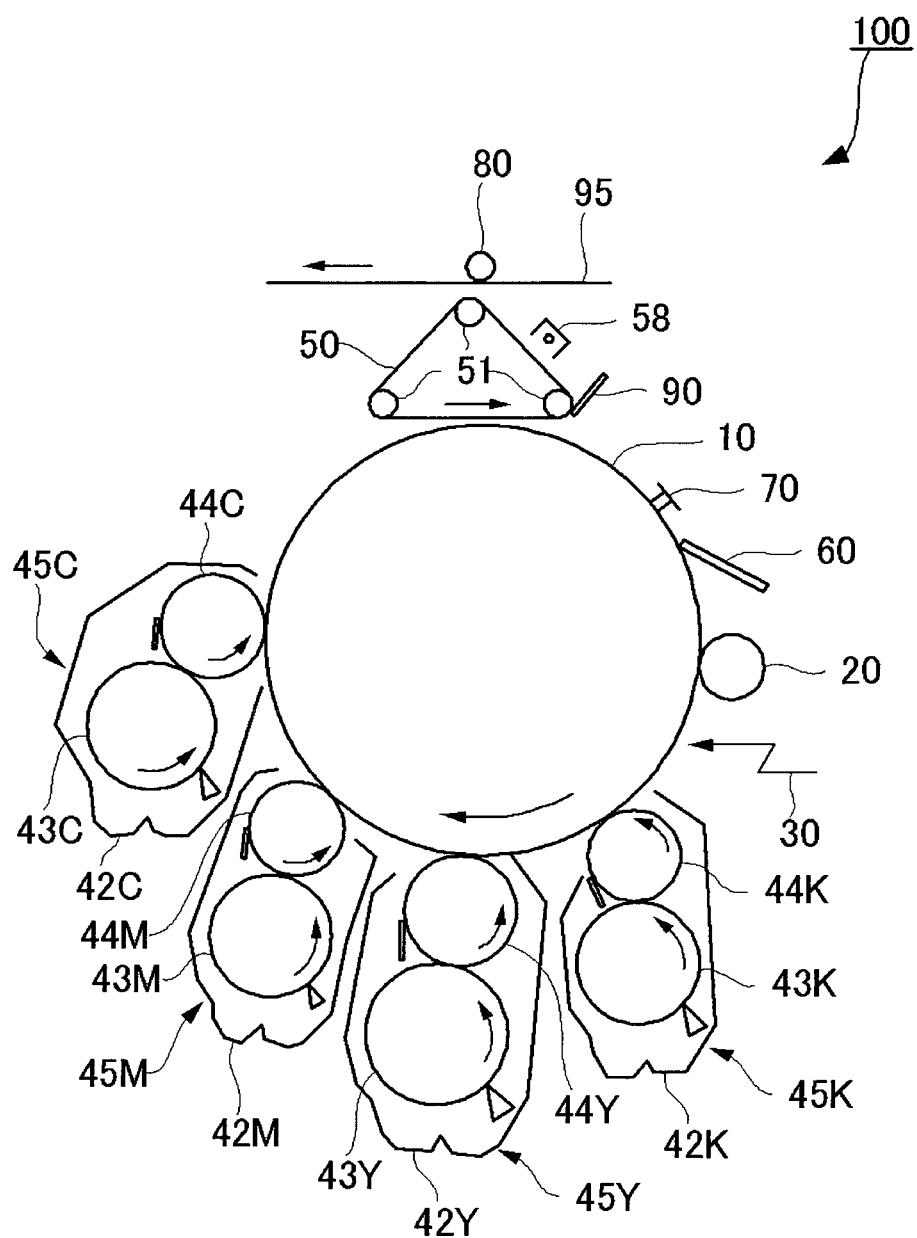
FIG. 4 is a schematic view showing another example of the image forming apparatus used in the image forming method of the present invention.

Another embodiment for carrying out the image forming method of the present invention by the above-mentioned image forming apparatus will be described with reference to FIG. 4. An image forming apparatus 100 as shown in FIG. 4 has the same configuration as that of the image forming apparatus 100 as shown in FIG. 3, except that no developing belt 41 in the image forming apparatus 100 as shown in FIG. 3 is provided and a black developing unit 45K, a yellow developing unit 45Y, a magenta developing unit 45M, and a cyan developing unit 45C are arranged around the photoconductor 10 in a directly opposing manner, and exhibits the same actions and effects. In FIG. 4, the same components as those in FIG. 3 are denoted with the same reference numerals.

Figure 5:
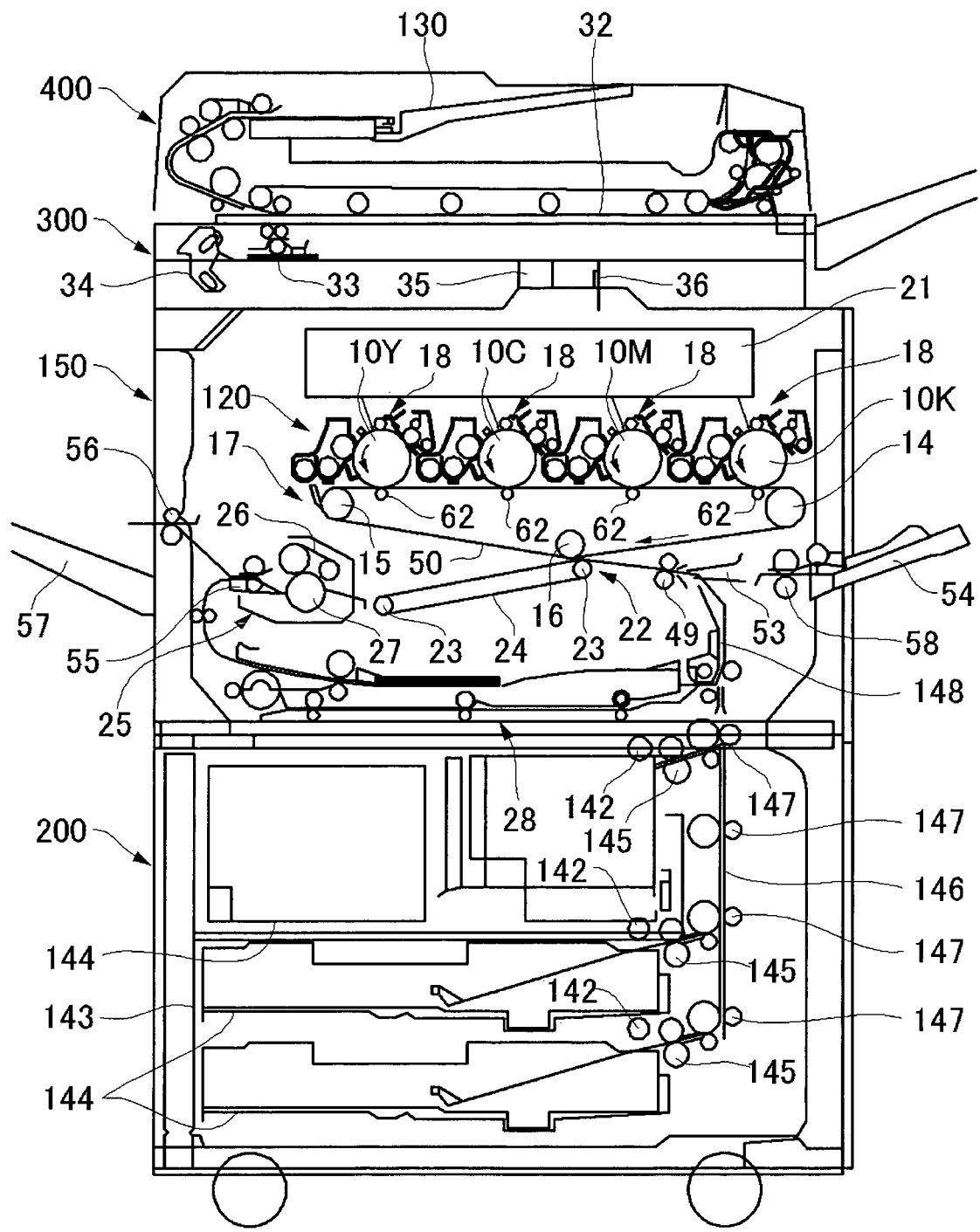
FIG. 5 is a schematic view showing an example of an image forming apparatus (tandem color image forming apparatus) used in the image forming method of the present invention.

Another embodiment for carrying out the image forming method of the present invention by the above-mentioned image forming apparatus will be described with reference to FIG. 5. A tandem image forming apparatus as shown in FIG. 5 is a tandem color image forming apparatus. The tandem image forming apparatus includes a copier body 150, a paper feed table 200, a scanner 300, and an automatic document feeder (ADF) 400.

In the copier body 150, an endless belt intermediate transfer medium 50 is provided at the center portion. The intermediate transfer medium 50 is stretched around support rollers 14, 15, and 16 and is made rotatable clockwise in FIG. 5. In the vicinity of the support roller 15, arranged is a cleaning device 17 for removing a residual toner on the intermediate transfer medium 50. On the intermediate transfer medium 50 stretched by the support roller 14 and the support roller 15, arranged along its conveying direction is a tandem developing device 120 for which four yellow, cyan, magenta, and black image forming units 18 are juxtaposed in an opposing manner. In the vicinity of the tandem developing device 120, arranged is an exposing device 21. On the side opposite to the side where the tandem developing device 120 is arranged on the intermediate transfer medium 50, a secondary transferring device 22 is arranged. In the secondary transferring device 22, a secondary transfer belt 24 serving as an endless belt is stretched across a pair of rollers 23, and a recording medium and the intermediate transfer medium 50 conveyed on the secondary transfer belt 24 can contact each other. In the vicinity of the secondary transferring device 22, arranged is a fixing device 25. The fixing device 25 includes a fixing belt 26 serving as an endless belt and a pressure roller 27 arranged while being pressed thereagainst.

Here, in the tandem image forming apparatus, arranged in the vicinity of the secondary transfer device 22 and the fixing device 25 is a sheet reversing device 28 for reversing a recording medium in order to form images on both surfaces of the recording medium.

Next, formation of a full-color image (color copy) using the tandem developing device 120 will be described. That is, first, a document is set on a document table 130 of the automatic document feeder (ADF) 400, or the automatic document feeder 400 is opened and a document is set on a contact glass 32 of the scanner 300, and then the automatic document feeder 400 is closed.

When the document has been set on the automatic document feeder 400, the scanner 300 is driven after the document is conveyed and moved onto the contact glass 32; on the other hand, when the document has been set on the contact glass 32, the scanner 300 is immediately driven, upon pressing a start switch (not shown), and a first traveler 33 and a second traveler 34 travel. At this time, by the first traveler 33, light from a light source is irradiated while a reflected light from the document surface is reflected by a mirror of the second traveler 34, the light is received by a reading sensor 36 through an imaging lens 35, and thus the color document (color image) is read as black, yellow, magenta, and cyan image information.

Figure 6:
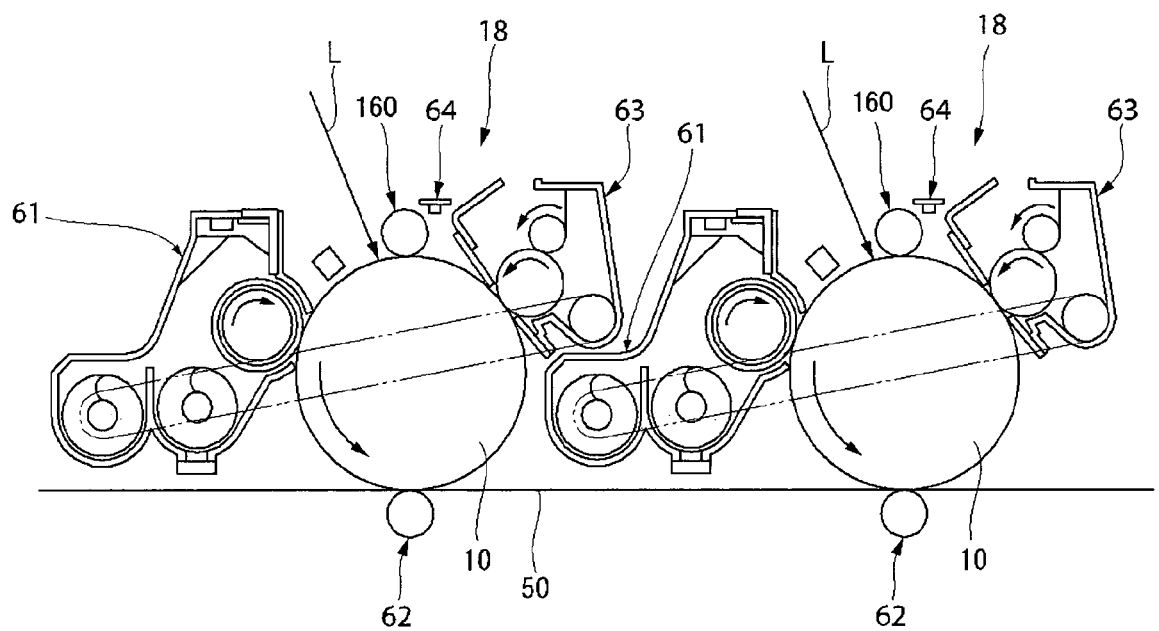
FIG. 6 is a partially enlarged schematic view of the image forming apparatus shown in FIG. 5.
Figure 7:
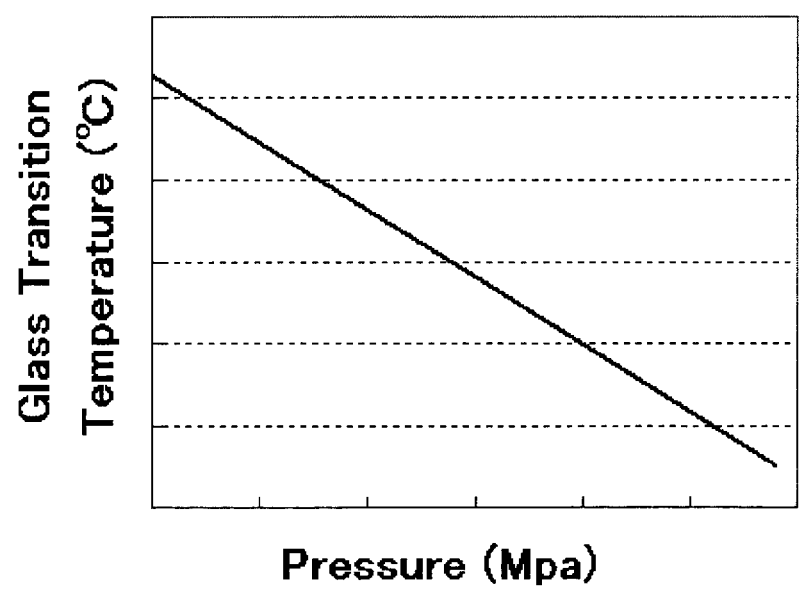
FIG. 7 shows a relation between the glass transition temperature of a pressure plastic material and a pressure applied by a compressive fluid.

Then, the respective black, yellow, magenta, and cyan image information are transmitted to the respective image forming units 18 (black image forming unit, yellow image forming unit, magenta image forming unit, and cyan image forming unit) of the tandem developing device 120, respectively, and black, yellow, magenta, and cyan toner images are formed by the respective image forming units. That is, the respective image forming units 18 (black image forming unit, yellow image forming unit, magenta image forming unit, and cyan image forming unit) of the tandem developing device 120 include, as shown in FIG. 6, photoconductors 10 (black photoconductor 10K, yellow photoconductor 10Y, magenta photoconductor 10M, and cyan photoconductor 10C), chargers 160 that uniformly charge the photoconductors 10, exposures that expose ("L" in FIG. 6) the photoconductors imagewise corresponding to respective color images based on the respective color image information and thereby form latent electrostatic images corresponding to the respective color images on the photoconductors, developing devices 61 that develop the latent electrostatic images with respective color toners (black toner, yellow toner, magenta toner, and cyan toner) to form toner images of the respective color toners, transfer chargers 62 that transfer the toner images onto the intermediate transfer medium 50, cleaning devices 63, and charge eliminating devices 64, respectively, and are capable of forming the respective single-color images (black image, yellow image, magenta image, and cyan image) based on the respective color image information. For the thus formed black image, yellow image, magenta image, and cyan image, a black image formed on the black photoconductor 10K, a yellow image formed on the yellow photoconductor 10Y, a magenta image formed on the magenta photoconductor 10M, and a cyan image formed on the cyan photoconductor 10C are respectively transferred (primary transfer) in sequence onto the intermediate transfer medium 50 rotationally moved by the support rollers 14, 15, and 16. Then, the black image, the yellow image, the magenta image, and the cyan image are superimposed on the intermediate transfer medium 50 to form a composite color image (color transfer image).

On the other hand, in the paper feed table 200, one of the paper feed rollers 142 is selectively rotated to let sheets (recording medium) out from one of the paper feed cassettes 144 provided in multiple tiers in a paper bank 143, and the sheets are separated from one another by a separation roller 145 and sent out one by one to a paper feed path 146, are conveyed by a conveyance roller 147 and guided to a paper feed path 148 within the copier body 150, and are made to hit against a registration roller 49 and stopped. Alternatively, the paper feed roller 142 is rotated to let sheets (recording medium) on a manual feed tray 54, and the sheets are separated from one another by the separation roller 145 and fed one by one into a manual paper feed path 53, and are similarly made to hit against the registration roller 49 and stopped. Here, the registration roller 49 is generally used grounded, but it may be used in a state where a bias is applied for removing paper powder of the sheets. Then, the registration roller 49 is rotated in timing with the composite color image (color transfer image) formed on the intermediate transfer medium 50 to send out the sheet (recording medium) between the intermediate transfer medium 50 and the secondary transferring unit 22, and the composite color image (color transfer image) is transferred (secondary transfer) onto the sheet (recording medium) by means of the secondary transferring unit 22 so as to form a color image on the sheet (recording medium). The residual toner on the intermediate transfer medium 50 after image is transferred is cleaned by the cleaning device 17 for the intermediate transfer medium.

The sheet (recording medium) on which a color image is transferred and formed is conveyed by the secondary transferring device 22 and sent out to the fixing device 25, and in the fixing device 25, the composite color image (color transfer image) is fixed onto the sheet (recording medium) by heat and pressure. Then, the sheet (recording medium) is switched by a switching claw 55, is discharged by a discharge roller 56, and is stacked on a discharged paper tray 57, or the sheet (recording medium) is switched by the switching claw 55, is reversed by the sheet reversing device 28, is guided again to the transfer position for recording an image on the rear surface as well, and then is discharged by the discharge roller 56 and is stacked on the discharged paper tray 57.

Since the toner of the present invention having a sharp particle size distribution and excellent toner properties (e.g., charging properties, environmental impact, and temporal stability) is used in the image forming method and the image forming apparatus of the present invention, high-quality images can be formed.

EXAMPLES

Hereinafter, Examples of the present invention will be specifically explained, which should not be construed to limit the present invention. All part(s) and % are expressed by mass unless indicated otherwise.

In Examples, a "method for producing particles" of the present invention is used as a "method for producing a toner", and a toner obtained by the "method for producing a toner" corresponds to a "toner" of the present invention.

In Examples, a weight average molecular weight (Mw), a number average molecular weight (Mn), a glass transition temperature, an acid value and an endothermic peak temperature by DSC of a resin were measured as described below.

<Measurement of Weight Average Molecular Weight (Mw) and Number Average Molecular Weight (Mn)>

The weight average molecular weight (Mw) and number average molecular weight (Mn) were measured by gel permeation chromatography (GPC) under the following conditions:

Instrument: GPC-8020 (manufactured by TOSOH CORPORATION)

Columns: TSK G2000HXL and G4000HXL (manufactured by TOSOH CORPORATION)

Temperature: 40° C.

Solvent: tetrahydrofuran (THF)

Flow rate: 1.0 mL/min

Sample: 1 mL of a sample having a concentration of 0.5% by mass

From a molecular weight distribution of a polymer measured under the above conditions, a molecular weight calibration curve was constructed according to a monodisperse polystyrene standard sample. By using the molecular weight calibration curve, the number average molecular weight (Mn) and weight average molecular weight (Mw) of the toner were calculated.

<Measurement of Glass Transition Temperature (Tg)>

Instrument: DSC (Q2000, manufactured by TA Instruments)

A sample (5 mg to 10 mg) loaded in a simple aluminum sealed pan was subjected to the following measurement process.

First heating: the sample was heated at 30° C. to 220° C. and 5° C./min., and after the temperature of the sample reached 220° C., kept for 1 minute.

Cooling: the sample was quenched to −20° C. without temperature control, and after the temperature of the sample reached −20° C., kept for 1 minute.

Second heating: the sample was heated at −20° C. to 180° C., and 5° C./min.

A value was read from a thermogram of the second heating by a midpoint method, and taken as a glass transition point.

<Measurement of Acid Value>

An acid value was measured in accordance with JIS K0070 (acid value of chemical products).

Production Example 1

Synthesis of Low Molecular Polyester

Into a reaction vessel equipped with a condenser, a stirrer and a nitrogen inlet tube, 230 parts of an ethylene oxide (2 mol) adduct of bisphenol A, 530 parts of a propylene oxide (3 mol) adduct of bisphenol A, 220 parts of terephthalic acid, 40 parts of adipic acid and 2 parts of dibutyltin oxide were charged, and reacted under normal pressure at 230° C. for 8 hours. Next, the reaction system was reacted under reduced pressure of 10 mmHg to 15 mmHg for 5 hours, and then 40 parts of trimellitic anhydride was added into the reaction vessel and further reacted under normal pressure at 180° C. for 2 hours to thereby obtain Low Molecular Polyester 1. The resultant Low Molecular Polyester 1 had a number average molecular weight (Mn) of 2,700, a weight average molecular weight (Mw) of 6,500, a glass transition temperature of 48° C. and an acid value of 23 mgKOH/g.

Production Example 2

Low Molecular Polyesters 2 to 4 were produced in the same manner as in Production Example 1, except that the amount of the raw material of the low molecular polyester was changed. The number average molecular weight (Mn), the weight average molecular weight (Mw), the glass transition temperature (Tg) and the acid value of the resultant Low Molecular Polyesters 2 to 4 are shown in Table 1.

Production Example 3

Into a reaction vessel equipped with a cooling tube, a stirrer and a nitrogen inlet tube, 900 parts of L-lactide, 100 pars of D-lactide, 6 parts of lauryl alcohol serving as a polymerization initiator, and 2 parts of Tin 2-ethylhexylate were charged, and reacted under normal pressure at 200° C. for 3 hours. Next, the reaction system was reacted under reduced pressure of 10 mmHg to 15 mmHg for 1 hour to thereby synthesize Low Molecular Polyester 5.

The resultant Low Molecular Polyester 5 had a number average molecular weight (Mn) of 10,000, a weight average molecular weight (Mw) of 17,000, a glass transition temperature (Tg) of 48° C. and an acid value of 3 mgKOH/g.

Production Example 4

Into a pressure-resistant reaction vessel, 900 parts of L-lactide, 100 parts of D-lactide, 33 parts of lauryl alcohol serving as an initiator, 33 parts of 4-pyrrolidinopyridine (PPY) were charged and heated to 60° C.

Next, into the pressure-resistant reaction vessel supercritical carbon dioxide (60° C., 10 MPa) was charged, and reacted at 60° C. for 12 hours.

After the reaction was completed, using a pressure pump and a back pressure valve, the flow rate of the outlet side of the back pressure valve was adjusted to 5.0 L/min, and the supercritical carbon dioxide was made to flow for 30 minutes, so as to remove PPY and a residual monomer (lactide).

Next, the vessel was gradually returned to normal temperature and normal pressure, and after 3 hours, polymer (polylactic acid) was taken out from the vessel, to thereby synthesize Low Molecular Polyester 6.

The resultant Low Molecular Polyester 6 had a number average molecular weight (Mn) of 20,000, a weight average molecular weight (Mw) of 27,000, and a glass transition temperature (Tg) of 52° C., and an acid value of 3 mgKOH/g.

TABLE 1

| Low Molecular Polyester No. | Mw | Mn | Tg (° C.) | Acid value (mgKOH/g) |
|---|---|---|---|---|
| 1 | 2,700 | 6,500 | 48 | 23 |
| 2 | 3,500 | 7,100 | 59 | 15 |
| 3 | 5,400 | 15,000 | 65 | 11 |
| 4 | 8,500 | 17,000 | 68 | 4 |
| 5 | 10,000 | 17,000 | 48 | 3 |
| 6 | 20,000 | 27,000 | 52 | 3 |

Production Example 5

Production of Masterbatch (MB)

Water (1,200 parts), 540 parts of carbon black (REAGAL 400R, manufactured by Cabot Corporation, DBP oil absorption=71 mL/100 and 1,200 parts of a polyester resin (Low Molecular Polyester 1) were mixed with a HENSCHEL MIXER (manufactured by NIPPON COKE & ENGINEERING COMPANY LIMITED). The resultant mixture was kneaded with a two-roll at 150° C. for 30 minutes, then rolled and cooled, and pulverized with a pulverizer, to thereby produce a Masterbatch 1.

Production Example 6

Masterbatches 2 to 6 shown in Table 2 were produced in the same manner as in Production Example 5, except that the pigment and resin used in Production Example 5 were respectively changed to the pigments and resins shown in Table 2.

TABLE 2

| Masterbatch No. | Pigment | Resin |
|---|---|---|
| 2 | PR57-1 (manufactured by DIC Corporation) | polyester |
| 3 | PY180 (manufactured by Clariant) | polyester |
| 4 | PB15:3 (manufactured by Dainichiseika Color & Chemicals Mfg. Co., Ltd.) | polyester |
| 5 | PB15:3 (manufactured by Dainichiseika Color & Chemicals Mfg. Co., Ltd.) | styrene-acrylic |
| 6 | PBk-7 Printex60 (manufactured by Degussa HÜLS AG) | polyester |

In Table 2, as the polyester resin Low Molecular Polyester 1 was used, and as the styrene-acrylic resin a resin synthesized as described below was used.

Into a reaction vessel equipped with a cooling tube, a nitrogen inlet tube, and a stirrer, 330 parts of styrene, 110 parts of n-butyl acrylate, 10 parts of acrylic acid, 50 parts of 2-butanone (solvent) were charged, and 8 parts of 2,2'-azobis(2,4-dimethylvaleronitrile) as a polymerization initiator was dissolved into the above raw material, to thereby prepare a polymerizable monomer composition. After the polymerizable monomer composition was subjected to polymerization reaction at 60° C. for 8 hours, it was heated to 150° C., and a solvent was removed therefrom under reduced pressure, and then the resultant product was taken out from the reaction vessel. After the resultant product was cooled to a room temperature, it was pulverized and formed into particles, to thereby obtain a styrene-acrylic resin having a glass transition temperature (Tg) of 65° C.

<Measurement of Endothermic Peak Temperature by DSC>

In differential scanning calorimetry (DSC), a melting point was determined by a peak top indicating the maximum endotherm of a DSC curve. The melting point was measured under the following conditions. The melting point was obtained from a DSC curve of the second heating in the following measurement method performed in the order of 1) to 3).

Measurement Conditions
Device: DSC-60A (manufactured by Shimadzu Corporation)
Sample: about 5.00 mg by precise weighing
Measurement temperature: −20° C. to 150° C.
Heating rate: 10° C./min
Cooling rate: −30° C./min
Measurement Method
1) Heating from −20° C. to 150° C. at 10° C./min.
2) Cooling from 150° C. to −20° C. at −30° C./min.
3) Heating from −20° C. to 150° C. at 10° C./min.

Production Example 7

Synthesis of Crystalline Polyester Resin

In a 5 L four-neck flask equipped with a nitrogen inlet tube, a dehydration tube, a stirrer and a thermocouple, 2,070 parts of 1,4-butanediol, 2,535 parts of fumaric acid, 291 parts of trimellitic anhydride and 4.9 parts of hydroquinone were charged, and reacted at 160° C. for 5 hours, and the reaction product was further reacted at 200° C. for 1 hour. Furthermore, the resultant product was reacted at 8.3 kPa for 1 hour, to thereby synthesize Crystalline Polyester Resin 1.

The resultant Crystalline Polyester Resin 1 had an endothermic peak temperature by DSC of 123° C., a number average molecular weight (Mn) of 710, and a weight average molecular weight (Mw) of 2,100.

Production Example 8

Crystalline Polyester Resins 2 to 7 shown in Table 3 were synthesized in the same manner as in Production Example 7, except that the types and amounts of the alcohol component and acid component in Production Example 7 were respectively changed to those shown in Table 3.

(E-84, manufactured by Orient Chemical Industries Co., Ltd.) were mixed with a HENSCHEL MIXER (manufactured by NIPPON COKE & ENGINEERING COMPANY, LIMITED). The resultant mixture was kneaded with a two-roll at 150° C. for 30 minutes, then rolled and cooled, and pulverized with a pulverizer, to thereby produce Toner Composition 1.

Production Example 10

Toner Compositions 2 to 13 shown in Table 4 were produced in the same manner as in Production Example 9, except that the types and amounts of the low molecular polyester, masterbatch, wax and charge controlling agent in Production Example 9 were respectively changed to those shown in Table 4.

TABLE 4

| Toner composition No. | Low Molecular Polyester No. | Masterbatch No. | Wax | Charge controlling agent |
|---|---|---|---|---|
| 2 | Low Molecular Polyester 1 800 parts | Masterbatch 2 220 parts | HNP-11 (manufactured by NIPPON SEIRO CO., LTD.) 55 parts | E-84 (manufactured by Orient Chemical Industries Co., Ltd.) 45 parts |
| 3 | Low Molecular Polyester 1 800 parts | Masterbatch 3 350 parts | WEP-5 (manufactured by NOF CORPORATION) 70 parts | TN-105 (manufactured by Hodogaya Chemical Co., Ltd.) 30 parts |
| 4 | Low Molecular Polyester 1 750 parts | Masterbatch 4 150 parts | WEP-5 (manufactured by NOF CORPORATION) 70 parts | TN-105 (manufactured by Hodogaya Chemical Co., Ltd.) 30 parts |
| 5 | Low Molecular Polyester 1 750 parts | Masterbatch 5 150 parts | Carnauba wax type1 (manufactured by S. Kato & Co.) 70 parts | TN-105 (manufactured by Hodogaya Chemical Co., Ltd.) 30 parts |
| 6 | Low Molecular Polyester 1 750 parts | Masterbatch 6 180 parts | HNP-9 (manufactured by NIPPON SEIRO CO., LTD.) 65 parts | TN-105 (manufactured by Hodogaya Chemical Co., Ltd.) 35 parts |
| 7 | Low Molecular Polyester 2 800 parts | Masterbatch 2 220 parts | HNP-9 (manufactured by NIPPON SEIRO CO., LTD.) 55 parts | — |
| 8 | Low Molecular Polyester 3 800 parts | Masterbatch 3 220 parts | HNP-9 (manufactured by NIPPON SEIRO CO., LTD.) 50 parts | — |
| 9 | Low Molecular Polyester 4 800 parts | Masterbatch 3 200 parts | HNP-11 (manufactured by NIPPON SEIRO CO., LTD.) 55 parts | — |
| 10 | Low Molecular Polyester 4 750 parts | Masterbatch 4 180 parts | HNP-9 (manufactured by NIPPON SEIRO CO., LTD.) 65 parts | TN-105 (manufactured by Hodogaya Chemical Co., Ltd.) 35 parts |
| 11 | Low Molecular Polyester 5 750 parts | Masterbatch 4 180 parts | HNP-9 (manufactured by NIPPON SEIRO CO., LTD.) 65 parts | TN-105 (manufactured by Hodogaya Chemical Co., Ltd.) 35 parts |
| 12 | Low Molecular Polyester 6 750 parts | Masterbatch 4 180 parts | HNP-9 (manufactured by NIPPON SEIRO CO., LTD.)65 parts | TN-105 (manufactured by Hodogaya Chemical Co., Ltd.) 35 parts |
| 13 | Low Molecular Polyester 6 750 parts | Masterbatch 4 180 parts | HNP-9 (manufactured by NIPPON SEIRO CO., LTD.) 65 parts | TN-105 (manufactured by Hodogaya Chemical Co., Ltd.) 35 parts |

TABLE 3

| Crystalline Polyester Resin No. | Melting point (° C.) | Endothermic peak temperature by DSC (° C.) | Mw | Mn |
|---|---|---|---|---|
| 2 | 108 | 113 | 2,800 | 1,000 |
| 3 | 98 | 100 | 2,300 | 800 |
| 4 | 113 | 119 | 3,300 | 700 |
| 5 | 94 | 100 | 1,500 | 800 |
| 6 | 91 | 99 | 11,900 | 2,400 |
| 7 | 55 | 53 | 9,735 | 3,425 |

Production Example 9

Preparation of Toner Composition 1

Low Molecular Polyester 1 (750 parts), 190 parts of Masterbatch 1, 60 parts of wax (HNP9, manufactured by NIPPON SEIRO CO., LTD.), and 50 parts of a charge controlling agent Production Example 14

Preparation of Toner Composition 14

Low Molecular Polyester 3 (700 parts), 160 parts of Masterbatch 3, 60 parts of wax (HNP9, manufactured by NIPPON SEIRO CO., LTD.), 25 parts of a charge controlling agent (TN-105 manufactured by Hodogaya Chemical Co., Ltd.), and 50 parts of Crystalline Polyester Resin 1 were mixed with a HENSCHEL MIXER (manufactured by NIPPON COKE & ENGINEERING COMPANY, LIMITED). The resultant mixture was kneaded with a two-roll at 150° C. for 30 minutes, then rolled and cooled, and pulverized with a pulverizer, to thereby produce Toner Composition 14.

Production Example 15

Toner Compositions 15 to 20 shown in Table 5 were produced in the same manner as in Production Example 14, except that the crystalline polyester resin in Production Example 14 was respectively changed to those shown in Table 5.

TABLE 5

| Toner Composition No. | Crystalline Polyester Resin No. |
|---|---|
| 15 | 2 |
| 16 | 3 |
| 17 | 4 |
| 18 | 5 |
| 19 | 6 |
| 20 | 7 |

Figure 8:
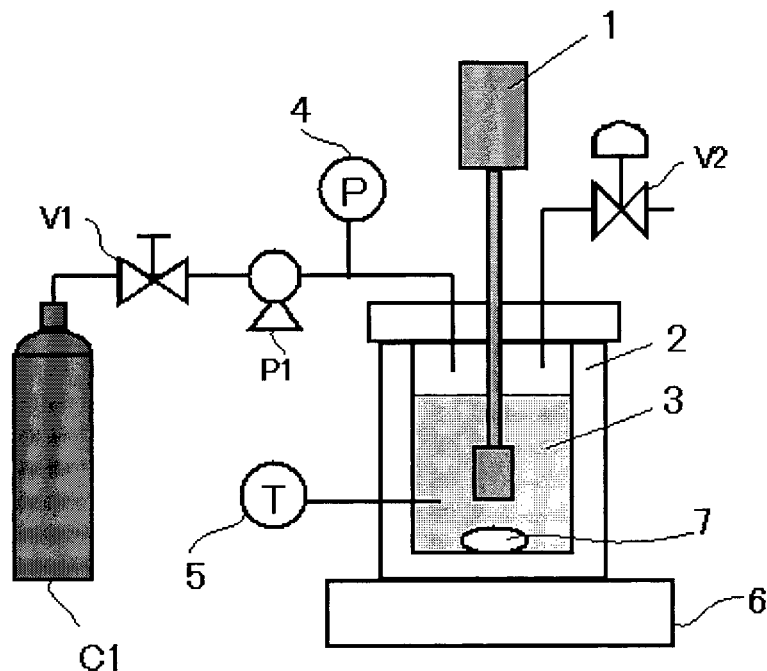
FIG. 8 is a schematic view showing an example of a high pressure cell into which a vibration viscometer (a viscometer XL/7, manufactured by Hydramotion Ltd.) is placed.

The melt viscosity of each of the prepared Toner Compositions 1 to 20 was measured under high pressure using a vibration viscometer (viscometer XL/7, manufactured by Hydramotion Ltd.) 1 placed in a high pressure cell (see FIG. 8).

<Measurement Method>

1. A sample 3 was placed in a high pressure cell 2 equipped with a thermostat, and then the cell 2 was sealed up.
2. While the sample 3 was stirred, a valve V1 was opened, and $CO_2$ was fed to the high pressure cell 2 using a pump P1. Upon feeding, a back pressure valve was set so that the high pressure cell was adjusted to a predetermined temperature and pressure.
3. After the high pressure cell had the predetermined temperature and pressure, the viscosity measurement was started. The value of the viscosity was recorded when the viscosity decreased and became substantially constant.

The results of the viscosity measurements are shown below.

(1) Toner Composition 1: 380 mPa·s (50° C., 30 MPa)
(2) Toner Composition 2: 370 mPa·s (70° C., 25 MPa)
(3) Toner Composition 3: 280 mPa·s (60° C., 60 MPa)
(4) Toner Composition 4: 1,230 mPa·s (100° C., 10 MPa)
(5) Toner Composition 5: 330 mPa·s (50° C., 50 MPa)
(6) Toner Composition 6: 400 mPa·s (40° C., 100 MPa)
(7) Toner Composition 7: 360 mPa·s (50° C., 50 MPa)
(8) Toner Composition 8: 190 mPa·s (100° C., 30 MPa)
(9) Toner Composition 9: 250 mPa·s (60° C., 100 MPa)
(10) Toner Composition 10: 470 mPa·s (50° C., 30 MPa)
(11) Toner Composition 11: 200 mPa·s (100° C., 20 MPa)
(12) Toner Composition 12: 500 mPa·s (100° C., 30 MPa)
(13) Toner Composition 13: 800 mPa·s (100° C., 20 MPa)
(14) Toner Composition 14: 90 mPa·s (100° C., 100 MPa)
(15) Toner Composition 15: 300 mPa·s (80° C., 20 MPa)
(16) Toner Composition 16: 210 mPa·s (80° C., 50 MPa)
(17) Toner Composition 17: 440 mPa·s (90° C., 10 MPa)
(18) Toner Composition 18: 310 mPa·s (70° C., 50 MPa)
(19) Toner Composition 19: 340 mPa·s (70° C., 30 MPa)
(20) Toner Composition 20: 180 mPa·s (50° C., 60 MPa)

Production Example 16

Synthesis of Surfactant S1

A pressure-resistant reaction vessel was charged with 1,250 parts of (1H,1H-perfluorooctyl)ethyl acrylate (manufactured by AZmax. co.), and 6.25 parts of 2,2'-azobisisobutyronitrile (also referred to as AIBN, manufactured by Wako Pure Chemical Industries, Ltd.) (50 volume % of the pressure-resistant reaction vessel). Carbon dioxide was selected as a supercritical fluid and the pressure-resistant reaction vessel was fed therewith using a feeding bomb. The vessel pressure was controlled at 30 MPa using a pressure pump, and the vessel temperature was controlled at 85° C. using a temperature controller, allowing a reaction to take place for 24 hours. After the reaction was completed, the pressure-resistant reaction vessel was cooled to a temperature of 0° C. and brought to normal pressure using a back pressure valve to obtain Surfactant S1.

The number average molecular weight (Mn) of the resultant Surfactant S1 was 30,000 as measured by gel permeation chromatography (GPC).

Example 1

In a pressure-resistant reaction vessel in an apparatus shown in FIG. 1, 95 parts of Toner Composition 1, 5 parts of a surfactant (Monasil PCA, manufactured by Croda International Plc) were measured and loaded, and then all valves V1 to V3 were closed, and the temperature of a thermostatic bath H1 was adjusted to 50° C. (treatment temperature).

Next, while the inside of the pressure-resistant reaction vessel was slowly stirred using a mixer M2, and the valve V1 was opened, and a $CO_2$ pump PU1 was operated to introduce $CO_2$ into the pressure-resistant reaction vessel until the pressure thereof became 30 MPa. Subsequently, the valve V1 was closed and the operation of the $CO_2$ pump was stopped, and then the state that the toner composition was sufficiently plasticized and fluidized was confirmed by visual observation. The toner composition was liquefied, but not dissolved in $CO_2$. There was an interface between $CO_2$ and the toner composition.

The valve V2 was opened, and a circulation pump PU2 was operated.

As a static mixer M1, a static mixer (product name: Mixer Bunsan, manufactured by Fujikin Incorporated) was used. The stirring speed of the mixer M2 was 8 m/s in terms of a circumferential speed of a stirring blade. After granulation, the valve V2 was closed, and the operation of the circulation pump PU2 was stopped, the mixer M2 was returned to slow stirring, and the thermostatic bath was cooled to approximately a room temperature. Thereafter, the valve V3 was opened to discharge $CO_2$, a cover was opened, and a formed Toner Base 1 having a volume average particle diameter of 5 μm was obtained.

Examples 2 to 20

Toner Bases 2 to 20 were produced in the same manner as in Example 1, except that Toner Composition 1 was respectively changed to Toner Compositions 2 to 20, and that the temperature and pressure conditions for toner formation were the same as the conditions of the viscosity measurement. Note that the resultant Toner Bases 2 to 20 respectively corresponded to Toner Compositions 2 to 20.

Example 21

Toner Base 21 was obtained in the same manner as in Example 1, except that as the surfactant, Monasil PCA (manufactured by Croda International Plc) in Example 1 was changed to Surfactant S1 obtained in Production Example 16. Toner Base 21 had a volume average particle diameter of 4.7 μm.

To 100 parts of each of the resultant toner bases, 0.7 parts of hydrophobic silica and 0.3 parts of hydrophobized titanium oxide were added and mixed using a HENSCHEL MIXER at a circumferential speed of 8 m/s for 5 minutes. The mixed powder was passed through 100 μm-aperture mesh to remove coarse particles. The toner (5%) treated with an external additive and 95% of a silicone resin-coated cupper-zinc ferrite carrier having an average particle diameter of 40 μm were uniformly mixed and charged with a TURBULA MIXER in which a vessel was rolled for stirring so as to prepare each of two-component Developers 1 to 21. Note that Developers 1 to 21 respectively corresponded to Toner Bases 1 to 21.

Moreover, to 100 parts of the toner base obtained in the same manner as in Example 1, 0.7 parts of hydrophobic silica and 0.3 parts of hydrophobized titanium oxide were added and mixed using a HENSCHEL MIXER at a circumferential speed of 8 m/s for 5 minutes, to thereby obtain each of one-component Developers 22 to 41. Note that the Developers 22 to 41 respectively corresponded to Toner Bases 1 to 20.

Comparative Example 1

Toner Composition 1 of Example 1 was sufficiently stirred and mixed in a HENSCHEL MIXER, and kneaded using a twin-screw extruder, and then cooled, followed by pulverizing and classifying, to thereby obtain a black-colored base toner having a volume average particle diameter of 7.5 µm (Comparative Toner 1).

As to kneading conditions, the temperature of a kneader was set so as to knead a material at low temperature (the lowest temperature in a range that a kneaded product was turned into a melted state). Namely, the temperature of the kneader was set in such a manner that the temperature of the resultant kneaded product became 120° C. at the outlet of the kneader.

To 100 parts of the resultant Comparative Toner 1, 0.7 parts of hydrophobic silica and 0.3 parts of hydrophobized titanium oxide were added and mixed using a HENSCHEL MIXER at a circumferential speed of 8 m/s for 5 minutes. Next, the toner (5%) treated with an external additive and 95% of a silicone resin-coated cupper-zinc ferrite carrier having an average particle diameter of 40 µm were uniformly mixed and charged with a TURBULA MIXER in which a vessel was rolled for stirring so as to prepare two-component Comparative. Developer 1.

Comparative Example 2

Comparative Toner 2 and Comparative Developer 2 were prepared in the same manner as in Comparative Example 1, except that Toner Composition 12 of Example 12 was used.

Comparative Example 3

A one-component Comparative Developer 3 was prepared by adding 0.7 parts of hydrophobic silica and 0.3 parts of hydrophobized titanium oxide to 100 parts of Comparative Toner 1 of Comparative Example 1, followed by mixing using a HENSCHEL MIXER at a circumferential speed of 8 m/s for 5 minutes.

Comparative Example 4

A one-component Comparative Developer 4 was prepared by adding 0.7 parts of hydrophobic silica and 0.3 parts of hydrophobized titanium oxide to 100 parts of Comparative Toner 2 of Comparative Example 2, followed by mixing using a HENSCHEL MIXER at a circumferential speed of 8 m/s for 5 minutes.

The particle size distribution of each of the resultant toners was measured as described below. The results are shown in Tables 6-1, 6-2, 7-1 and 7-2.
<Measurement of Volume. Average Particle Diameter (Dv) and Particle Size Distribution (Dv/Dn) of Toner>

As a measurement apparatus of particle size distribution of toner particles by the Coulter Counter method, for example, Coulter Counter TA-II or COULTER MULTISIZER II (manufactured by Beckman Coulter, Inc.) was used. A measurement method will be described below.

First, as a dispersant, 0.1 mL to 5 mL of a surfactant (polyoxyethylene alkyl ether: product name, DRYWELL) was added to 100 mL to 150 mL of an electrolytic aqueous solution. Note that the electrolytic solution was a 1% NaCl aqueous solution prepared using primary sodium chloride, for example, ISOTON-II (manufactured by Beckmann Coulter Inc.). Subsequently, 2 mg to 20 mg of a sample to be measured was further added. The electrolytic solution in which the sample was suspended was subjected to dispersion treatment for approximately 1 minute to approximately 3 minutes using an ultrasonic dispersion device. By the measurement apparatus using 100 µm-aperture, the volume and the number of toner particles or a toner were measured, and then its volume distribution and number distribution were calculated. From these distributions, the volume average particle diameter (Dv) and the number average particle diameter (Dn) of the toner were obtained.

In the measurement, the following 13 channels were used to measure particles having diameters of 2.00 µm or greater and smaller than 40.30 µm: a channel having a diameter of 2.00 µm or greater and smaller than 2.52 µm, a channel having a diameter of 2.52 µm or greater and smaller than 3.17 µm; a channel having a diameter of 3.17 µm or greater and smaller than 4.00 µm; a channel having a diameter of 4.00 µm or greater and smaller than 5.04 µm; a channel having a diameter of 5.04 µm or greater and smaller than 6.35 µm; a channel having a diameter of 6.35 µm or greater and smaller than 8.00 µm; a channel having a diameter of 8.00 µm or greater and smaller than 10.08 µm; a channel having a diameter of 10.08 µm or greater and smaller than 12.70 µm; a channel having a diameter of 12.70 µm or greater and smaller than 16.00 µm; a channel having a diameter of 16.00 µm or greater and smaller than 20.20 µm; a channel having a diameter of 20.20 µm or greater and smaller than 25.40 µm; a channel having a diameter of 25.40 µm or greater and smaller than 32.00 µm; and a channel having a diameter of 32.00 µm or greater and smaller than 40.30 µm.

The resultant Developers 1 to 41 and Comparative Developers 1 to 4 were respectively loaded in an image forming apparatus, IPSIO COLOR 8100 (manufactured by Ricoh Company, Ltd.) used for evaluation of the two-component developer, or IMAGIO NEO C200 (manufactured by Ricoh Company, Ltd.) used for evaluation of the one-component developer, and then images were output and evaluated as described below. The results are shown in Tables 6-1, 6-2, 7-1, and 7-2.
<Image Density>

Using each developer, a solid image was output on plain transfer paper (Type 6200, manufactured by Ricoh Company, Ltd.), with the low adhesion amount of the developer being $0.3\pm0.1$ mg/cm$^2$, and then the image density was measured using X-Rite (manufactured by X-Rite).
Evaluation Criteria
   A: Image density was 1.4 or more.
   B: Image density was 1.35 or more and less than 1.4.
   C: Image density was 1.3 or more and less than 1.35.
   D: Image density was less than 1.3.
<Cleaning Ability>

A residual toner on a photoconductor just after cleaned was transferred onto white paper with a SCOTCH TAPE (manufactured by Sumitomo 3M Limited) after 1,000 sheets of a chart having an image area of 95% were output. The density of the white paper was measured using Macbeth reflection densitometer RD514, and evaluated based on the following evaluation criteria.
Evaluation Criteria
A: Difference from blank was less than 0.005.
B: Difference from blank was 0.005 to 0.010.
C: Difference from blank was 0.011 to 0.02.
D: Difference from blank was more than 0.02.
<Transferability>
A residual toner on a photoconductor just before cleaning was transferred onto white paper with a SCOTCH TAPE (manufactured by Sumitomo 3M Ltd.) after a chart having an image area of 20% was transferred from the photoconductor to paper. The density of the white paper was measured using MACBETH REFLECTION DENSITOMETER RD514, and evaluated based on the following evaluation criteria.
Evaluation Criteria
A: Difference from blank was less than 0.005.
B: Difference from blank was 0.005 to 0.010.
C: Difference from blank was 0.011 to 0.02.
D: Difference from blank was more than 0.02.
<Toner Scattering>
After 100,000 sheets of a chart having an image area of 5% were continuously output using each of toners in an image forming apparatus (IPSIO COLOR 8100, manufactured by Ricoh Company, Ltd.), which had been converted to oilless fixing system and tuned for evaluation, at a temperature of 40° C. and 90% RH, the level of toner contamination in the image forming apparatus was visually observed and evaluated based on the following criteria.
Evaluation Criteria
A: No toner contamination was observed at all in the image forming apparatus, and an excellent state was maintained.
B: Slight toner contamination was observed in the image forming apparatus, and a satisfactory state was maintained.
C: Toner contamination was observed in the image forming apparatus, however, it was still on the practical level.
D: Severe toner contamination was observed in the image forming apparatus, and it was far from the practical level.
<Charge Stability>
The endurance test of 100,000 sheets continuous output was performed using each of toners and a character and image pattern having an image area of 12%, and change of charge amount in the endurance test was evaluated. A small amount of the developer was taken from a sleeve, and the change of the charge amount was found by the blowoff method and evaluated based on the following evaluation criteria.
Evaluation Criteria
A: Change of the charge amount was less than 5 μc/g.
B: Change of the charge amount was 5 μc/g to 10 μc/g.
C: Change of the charge amount was more than 10 μc/g.
<Filming>
After 1,000 sheets of respective band charts having image areas of 100%, 75% and 50% were output, the filming over a developing roller and photoconductor were visually observed and evaluated based on the following evaluation criteria.
Evaluation Criteria
A: No filming occurred.
B: Filming slightly occurred.
C: Streaky filming occurred.
D: Filming occurred all over the developing roller and photoconductor.

TABLE 6-1

| | Developer No. | Toner base No. | Toner particle size distribution | | | Image density |
| --- | --- | --- | --- | --- | --- | --- |
| | | | Volume average particle diameter Dv (μm) | Number average particle diameter Dn (μm) | Dv/Dn | |
| Example 1 | 1 | 1 | 5.0 | 4.2 | 1.19 | A |
| Example 2 | 2 | 2 | 5.7 | 4.6 | 1.24 | B |
| Example 3 | 3 | 3 | 5.5 | 4.6 | 1.20 | B |
| Example 4 | 4 | 4 | 9.5 | 7.5 | 1.27 | A |
| Example 5 | 5 | 5 | 4.9 | 4.2 | 1.17 | A |
| Example 6 | 6 | 6 | 4.8 | 4.3 | 1.12 | A |
| Example 7 | 7 | 7 | 5.6 | 4.5 | 1.24 | B |
| Example 8 | 8 | 8 | 8.8 | 6.8 | 1.29 | B |
| Example 9 | 9 | 9 | 5.9 | 4.9 | 1.20 | A |
| Example 10 | 10 | 10 | 5.8 | 5.0 | 1.16 | A |
| Example 11 | 11 | 11 | 5.7 | 4.2 | 1.36 | B |
| Example 12 | 12 | 12 | 5.3 | 4.1 | 1.29 | B |
| Example 13 | 13 | 13 | 7.5 | 5.8 | 1.29 | A |
| Example 14 | 14 | 14 | 7.2 | 5.9 | 1.22 | A |
| Example 15 | 15 | 15 | 6.9 | 5.5 | 1.25 | B |
| Example 16 | 16 | 16 | 10.5 | 7.9 | 1.33 | A |
| Example 17 | 17 | 17 | 8.5 | 6.8 | 1.25 | A |
| Example 18 | 18 | 18 | 6.2 | 5.2 | 1.19 | A |
| Example 19 | 19 | 19 | 5.3 | 4.6 | 1.15 | A |
| Example 20 | 20 | 20 | 4.7 | 4.2 | 1.12 | A |
| Example 21 | 21 | 21 | 5.9 | 4.3 | 1.37 | B |
| Comparative Example 1 | Comparative developer 1 | Comparative toner 1 | 7.5 | 5.4 | 1.39 | C |
| Comparative Example 2 | Comparative developer 2 | Comparative toner 2 | 6.8 | 5.1 | 1.33 | D |

TABLE 6-2

| | Cleaning ability | Transferability | Toner scattering | Charge stability | Filming |
| --- | --- | --- | --- | --- | --- |
| Ex. 1 | A | A | A | A | A |
| Ex. 2 | A | B | B | A | B |
| Ex. 3 | A | A | A | A | A |
| Ex. 4 | A | A | A | A | A |
| Ex. 5 | A | A | B | A | A |
| Ex. 6 | B | A | A | A | A |
| Ex. 7 | A | B | B | A | A |
| Ex. 8 | A | A | A | A | A |

TABLE 6-2-continued

| | Cleaning ability | Transferability | Toner scattering | Charge stability | Filming |
|---|---|---|---|---|---|
| Ex. 9 | A | A | A | A | A |
| Ex. 10 | B | A | A | A | A |
| Ex. 11 | B | B | B | B | B |
| Ex. 12 | B | B | B | A | B |
| Ex. 13 | A | A | A | A | A |
| Ex. 14 | B | A | B | A | A |
| Ex. 15 | B | A | A | A | A |
| Ex. 16 | A | A | A | A | A |
| Ex. 17 | A | A | A | A | A |
| Ex. 18 | A | A | A | A | B |
| Ex. 19 | A | A | A | A | A |
| Ex. 20 | B | A | A | A | A |
| Ex. 21 | B | B | B | B | B |
| Comp. Ex. 1 | C | C | C | C | D |
| Comp. Ex. 2 | D | D | D | C | D |

TABLE 7-1

| | Developer No. | Toner base No. | Volume average particle diameter Dv (μm) | Number average particle diameter Dn (μm) | Dv/Dn | Image density |
|---|---|---|---|---|---|---|
| Example 22 | 22 | 1 | 5.0 | 4.2 | 1.19 | A |
| Example 23 | 23 | 2 | 5.7 | 4.6 | 1.24 | B |
| Example 24 | 24 | 3 | 5.5 | 4.6 | 1.20 | B |
| Example 25 | 25 | 4 | 9.5 | 7.5 | 1.27 | A |
| Example 26 | 26 | 5 | 4.9 | 4.2 | 1.17 | A |
| Example 27 | 27 | 6 | 4.8 | 4.3 | 1.12 | A |
| Example 28 | 28 | 7 | 5.6 | 4.5 | 1.24 | B |
| Example 29 | 29 | 8 | 8.8 | 6.8 | 1.29 | B |
| Example 30 | 30 | 9 | 5.9 | 4.9 | 1.20 | A |
| Example 31 | 31 | 10 | 5.8 | 5.0 | 1.16 | A |
| Example 32 | 32 | 11 | 5.7 | 4.2 | 1.36 | B |
| Example 33 | 33 | 12 | 5.3 | 4.1 | 1.29 | B |
| Example 34 | 34 | 13 | 7.5 | 5.8 | 1.29 | A |
| Example 35 | 35 | 14 | 7.2 | 5.9 | 1.22 | A |
| Example 36 | 36 | 15 | 6.9 | 5.5 | 1.25 | B |
| Example 37 | 37 | 16 | 10.5 | 8.1 | 1.30 | A |
| Example 38 | 38 | 17 | 8.5 | 6.8 | 1.25 | A |
| Example 39 | 39 | 18 | 6.2 | 5.2 | 1.19 | A |
| Example 40 | 40 | 19 | 5.3 | 4.6 | 1.15 | A |
| Example 41 | 41 | 20 | 4.7 | 4.2 | 1.12 | A |
| Comparative Example 3 | Comparative developer 3 | Comparative toner 1 | 7.5 | 5.4 | 1.39 | D |
| Comparative Example 4 | Comparative developer 4 | Comparative toner 2 | 6.8 | 5.1 | 1.33 | D |

TABLE 7-2

| | Cleaning ability | Transferability | Toner scattering | Charge stability | Filming |
|---|---|---|---|---|---|
| Ex. 22 | A | A | A | A | A |
| Ex. 23 | A | B | A | A | B |
| Ex. 24 | A | A | A | A | A |
| Ex. 25 | A | A | A | A | A |
| Ex. 26 | B | A | B | A | A |
| Ex. 27 | B | A | A | A | A |
| Ex. 28 | A | B | A | A | A |
| Ex. 29 | B | A | A | A | A |
| Ex. 30 | B | A | A | A | A |
| Ex. 31 | B | A | A | A | A |
| Ex. 32 | B | B | B | B | B |
| Ex. 33 | B | B | B | A | B |
| Ex. 34 | A | A | A | A | A |
| Ex. 35 | B | A | B | A | A |
| Ex. 36 | B | A | A | A | A |
| Ex. 37 | A | A | A | A | A |
| Ex. 38 | B | A | A | A | A |
| Ex. 39 | A | A | A | A | B |
| Ex. 40 | A | A | A | A | A |
| Ex. 41 | B | A | A | A | B |
| Comp. Ex. 3 | D | C | D | C | D |
| Comp. Ex. 4 | D | D | D | C | D |

From the results of Tables 6-1, 6-2, 7-1 and 7-2, it had been confirmed that Developers 1 to 41 of Examples 1 to 41 using the toners obtained by polymerization in the supercritical fluid were superior in the image density, cleaning ability, transferability, toner scattering, charge stability, and filming, to Comparative Developers 1 to 4 of Comparative Examples 1 to 4, and contributed to obtaining high density image.

Moreover, according to the method for producing the toner of the present invention, a dried toner could be obtained by polymerization only by adjusting the pressure back to normal without performing a drying step and with no waste liquid generated, thus the present invention provides an innovative method for producing a toner in terms of low cost, low environmental load, energy saving, and resource saving.

The number average molecular weights (Mn), weight average molecular weights (Mw) and Mw/Mn of the toner base produced in Example 1 and Comparative Toner 1 of Comparative Example 1 are shown in Table 8.

TABLE 8

| | Number average molecular weight (Mn) | Weight average molecular weight (Mw) | Mw/Mn |
|---|---|---|---|
| Ex. 1 | 2,700 | 6,500 | 2.41 |
| Comp. Ex. 1 | 2,500 | 6,400 | 2.56 |

INDUSTRIAL APPLICABILITY

The method for producing particles of the present invention can be widely used to a method for producing a toner, and the like. Moreover, a toner produced by the method for producing a toner of the present invention can be widely used, for example, for laser printers, direct digital plate-making systems, full-color copiers using direct- or indirect-electrographic multicolor image developing setup, full-color laser printers, full-color plain paper faxes, and the like.

REFERENCE SIGNS LIST 1 vibration viscometer
2 high pressure cell
3 sample
4 pressure gauge
5 thermometer
6 stirrer
7 stir bar
C1 $CO_2$ bomb
H1 thermostatic bath
M1 static mixer
M2 mixer
V1 valve
V2 valve
V3 valve
VE1 valve
PU1 $CO_2$ pump
PU2 circulation pump
10 photoconductor (photoconductor drum, latent electrostatic image bearing member)
10K black photoconductor
10Y yellow photoconductor
10M magenta photoconductor
10C cyan photoconductor
14 support roller
15 support roller
16 support roller
17 cleaning device for the intermediate transfer medium
18 image forming unit
20 charging roller
21 exposing device
22 secondary transferring device
23 roller
24 secondary transfer belt
25 fixing device
26 fixing belt
27 pressure roller
28 sheet reversing device
30 exposing device
32 contact glass
33 first traveler
34 second traveler
35 imaging lens
36 reading sensor
40 developing device
41 developing belt
42K developer containing portion
42Y developer containing portion
42M developer containing portion
42C developer containing portion
43K developer feed roller
43Y developer feed roller
43M developer feed roller
43C developer feed roller
44K developing roller
44Y developing roller
44M developing roller
44C developing roller
45K black developing unit
45Y yellow developing unit
45M magenta developing unit
45C cyan developing unit
49 registration roller
50 intermediate transfer medium
51 roller
53 manual paper feed path
54 manual feed tray
55 switching claw
56 discharge roller
57 discharged paper tray
58 corona charger
60 cleaning device
61 developing device
62 transfer charger
63 photoconductor cleaning device
64 charge eliminating device
70 charge eliminating lamp
80 transfer roller
90 cleaning device
95 recording medium
100 image forming apparatus
101 photoconductor (latent electrostatic image bearing member)
102 charging unit
103 exposure
104 developing unit
105 recording medium
107 cleaning unit
108 transferring unit
112 ejection container
113 ejection nozzle
114 pressure sensor
117 heater
120 tandem developing device
130 document table
142 paper feed roller
143 paper bank
144 paper feed cassette
145 separation roller
146 paper feed path
147 conveyance roller
148 paper feed path
150 copier body
160 charger
200 paper feed table
300 scanner
400 automatic document feeder (ADF)

The invention claimed is:

1. A method for producing particles, the method comprising:
contacting a compressive fluid with a pressure plastic material to plasticize the pressure plastic material, thereby obtaining a plasticized pressure plastic material, and
applying a shear force to the compressive fluid and the plasticized pressure plastic material, with an interface therebetween, in the presence of a surfactant to granulate the pressure plastic material in the compressive fluid and to produce particles.

2. The method of claim 1, wherein the surfactant comprises, in a main chain or a side chain, at least one selected from the group consisting of a perfluoroalkyl group, a polydimethylsiloxane group, and a polyethylene glycol group.

3. The method of claim 1, wherein the plasticized pressure plastic material has a viscosity at 25° C. of 500 mPa·s or lower.

4. The method of claim 1, wherein the contacting comprises plasticizing at a temperature lower than or equal to a thermal decomposition temperature of the pressure plastic material.

5. The method of claim 1, wherein the pressure plastic material is at least one selected from the group consisting of a polyester resin, a vinyl resin, a urethane resin, and a polycarbonate resin.

6. The method of claim 5, wherein
the polyester resin, if present, is at least one resin obtained by polymerizing a ring-opening monomer and
the polycarbonate resin, if present, is at least one resin obtained by polymerizing a ring-opening monomer.

7. The method of claim 1, wherein the compressive fluid comprises supercritical carbon dioxide, liquefied carbon dioxide, or both.

8. The method of claim 1, wherein the contacting comprises plasticizing at a temperature lower than or equal to a melting point temperature of the pressure plastic material.

9. The method of claim 1, wherein the contacting comprises applying a pressure of at least 1 MPa to the compressive fluid.

10. The method of claim 9, wherein the contacting comprises applying a pressure of from 2 to 200 MPa to the compressive fluid.

11. The method of claim 9,
wherein the compressive fluid is carbon dioxide, and
the contacting comprises applying a pressure of at least 3.7 MPa to the compressive fluid.

12. The method of claim 1, wherein an amount of the surfactant in the compressive fluid is from 0.01% to 30% by mass.

13. A method for producing a toner, comprising:
contacting a compressive fluid with a toner composition comprising a pressure plastic material and a colorant to plasticize the pressure plastic material, thereby obtaining a plasticized pressure plastic material, and
applying a shear force to the compressive fluid and the plasticized pressure plastic material, with an interface therebetween, in the presence of a surfactant to granulate the toner composition in the compressive fluid and to produce a toner.

14. The method of claim 13, wherein an amount of the colorant is from 1 part by mass to 50 parts by mass, relative to 100 parts by mass of the pressure plastic material.

15. The method of claim 13, wherein
the toner composition further comprises a dispersant, and
the dispersant comprises an organic fine particle, an inorganic fine particle, or both.

16. The method of claim 13, wherein the toner composition further comprises a wax as a releasing agent.

* * * * *